United States Patent
Liu et al.

(10) Patent No.: US 12,494,096 B2
(45) Date of Patent: Dec. 9, 2025

(54) VEHICLE DRIVING AUTHORITY TRANSFER METHOD AND APPARATUS

(71) Applicant: Shenzhen Yinwang Intelligent Technologies Co., Ltd., Shenzhen (CN)

(72) Inventors: Hang Liu, Beijing (CN); Mingchao Li, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 504 days.

(21) Appl. No.: 17/573,334

(22) Filed: Jan. 11, 2022

(65) Prior Publication Data

US 2022/0130187 A1 Apr. 28, 2022

Related U.S. Application Data

(63) Continuation of application No. PCT/CN2020/094745, filed on Jun. 5, 2020.

(30) Foreign Application Priority Data

Jul. 11, 2019 (CN) .......................... 201910625024.9

(51) Int. Cl.
*G07C 5/08* (2006.01)
*B60W 30/08* (2012.01)
(Continued)

(52) U.S. Cl.
CPC ........... *G07C 5/0816* (2013.01); *B60W 30/08* (2013.01); *B60W 30/18109* (2013.01);
(Continued)

(58) Field of Classification Search
CPC .................................................. G07C 5/0816
See application file for complete search history.

(56) References Cited

U.S. PATENT DOCUMENTS 8,849,494 B1 * 9/2014 Herbach ............. G05D 1/0044
701/24
10,319,039 B1 * 6/2019 Konrardy ............... G06Q 40/08
(Continued)

FOREIGN PATENT DOCUMENTS

CN 101881819 A 11/2010
CN 104580327 A 4/2015
(Continued)

OTHER PUBLICATIONS

Yamamoto et al., "Vehicular Domain Enablement," oneM2M-TR-0026-V-4.4.0, total 182 pages (Jan. 2019).

*Primary Examiner* — Jean Paul Cass
(74) *Attorney, Agent, or Firm* — Leydig, Voit & Mayer, Ltd.

(57) ABSTRACT

A vehicle driving authority transfer method and apparatus are described for assisted driving and automated driving. The method includes checking a status of a system of a vehicle before a driving authority of the vehicle is transferred. The driving authority of the vehicle is transferred only when the vehicle is at a normal status. Therefore, the status of the system of the vehicle is checked before transferring the driving authority of the intelligent vehicle, thereby avoiding a liability dispute arising from a traffic accident caused by abnormality of the status of the system of the vehicle, especially by abnormality of a braking system and/or a steering system closely related to vehicle operability/manipulability, after the driving authority of the vehicle is transferred.

28 Claims, 7 Drawing Sheets

(51) Int. Cl.
 B60W 30/18 (2012.01)
 B60W 60/00 (2020.01)
 B62D 15/02 (2006.01)
 G07C 5/00 (2006.01)
(52) U.S. Cl.
 CPC ......... B60W 60/001 (2020.02); B62D 15/021 (2013.01); G07C 5/006 (2013.01); G07C 5/0808 (2013.01)

(56) References Cited

U.S. PATENT DOCUMENTS

| | | | |
|---|---|---|---|
| 10,805,068 B1 * | 10/2020 | Leise | G07C 5/0816 |
| 2002/0140811 A1 | 10/2002 | Schuette | |
| 2013/0151070 A1 | 6/2013 | Bock et al. | |
| 2014/0195213 A1 | 7/2014 | Kozloski et al. | |
| 2017/0297565 A1 | 10/2017 | Joyce et al. | |
| 2018/0136655 A1 | 5/2018 | Kim et al. | |
| 2019/0379683 A1 * | 12/2019 | Overby | G06F 9/45533 |
| 2020/0175782 A1 * | 6/2020 | Tokman | G07C 5/085 |
| 2020/0175783 A1 * | 6/2020 | Adams | G07C 5/0808 |
| 2021/0183171 A1 * | 6/2021 | Shiue | H04L 67/12 |
| 2021/0192867 A1 * | 6/2021 | Fang | G07C 5/0816 |
| 2021/0256782 A1 * | 8/2021 | Ehlers | G07C 5/0816 |
| 2021/0309237 A1 * | 10/2021 | Sekiguchi | G06F 8/65 |
| 2022/0089170 A1 * | 3/2022 | Hu | B60W 60/0053 |
| 2022/0292971 A1 * | 9/2022 | Park | G06V 20/586 |

FOREIGN PATENT DOCUMENTS

| | | | | |
|---|---|---|---|---|
| CN | 105197012 A | | 12/2015 | |
| CN | 106781688 A | | 5/2017 | |
| CN | 108469806 A | | 8/2018 | |
| CN | 108490949 A | | 9/2018 | |
| CN | 109070924 A | | 12/2018 | |
| CN | 109615927 A | | 4/2019 | |
| CN | 109725638 A | | 5/2019 | |
| JP | H04218458 A | | 8/1992 | |
| JP | H05199605 A | | 8/1993 | |
| JP | H06286625 A | | 10/1994 | |
| JP | H0752769 A | | 2/1995 | |
| JP | H0752769 Y2 | * | 12/1995 | |
| JP | 2003063373 A | | 3/2003 | |
| JP | 2004330892 A | | 11/2004 | |
| JP | 2018203180 A | | 12/2018 | |
| JP | 2019035220 A | | 3/2019 | |
| JP | 2020075717 A | * | 5/2020 | ............ B60R 25/01 |
| JP | 2021066224 A | * | 4/2021 | ............ G06N 20/00 |

\* cited by examiner

VEHICLE DRIVING AUTHORITY TRANSFER METHOD AND APPARATUS

CROSS-REFERENCE TO RELATED APPLICATIONS

This application is a continuation of International Application No. PCT/CN2020/094745, filed on Jun. 5, 2020, which claims priority to Chinese Patent Application No. 201910625024.9, filed on Jul. 11, 2019. The disclosures of the aforementioned applications are hereby incorporated by reference in their entireties.

TECHNICAL FIELD

This application relates to the field of computer technologies and/or mobile communications technologies, and in particular, to a vehicle driving authority transfer method and apparatus.

BACKGROUND

With continuous development of an automated driving technology, the automated driving technology is rapidly developed and widely used. A driving automation level is becoming higher. This greatly reduces driving burden of people, and gradually liberates hands and eyes of people, so that people can perform activities other than a driving activity on a trip, thereby greatly making lives of people convenient.

A current automated driving system gradually tends to be unmanned, in other words, the automated driving system completes an entire dynamic driving task. According to classification of driving automation levels by the Society of Automotive Engineers (SAE), there are levels L0 to L5, which are no automation (L0), driver assistance (L1), partial automation (L2), conditional automation (L3), high automation (L4), and full automation (L5). As the driving automation level constantly increases, people take decreased participation in a driving activity. At present, a growing quantity of systems of the level L4 (high automation) gradually appear in the market, including a low-speed automated driving system, an automated valet parking system (AVPS), and the like. The automated valet parking system is a typical representation.

The automated valet parking system may provide an automated valet parking service for a user. The system may organize a plurality of parking lots with a valet parking function, and provide information about an idle parking space in the parking lot for the user. The user may reserve a parking space in advance by using a portable terminal device, and then drive to a parking lot. The user may leave a vehicle in a specified drop-off area, and the automated valet parking system automatically directs the vehicle to an idle parking space. When the user needs to retrieve the vehicle, the user sends a retrieval request, and the automated valet parking system automatically directs the parked vehicle to a specified pickup area. In this case, the user can drive the vehicle again and exit a parking facility (parking lot). The automated valet parking system may be used for a shopping mall parking lot, an airport parking lot, a public parking lot, and the like. The automated valet parking system can reduce a time of searching for a parking space by the user, which greatly helps people to park.

In the automated valet parking system, a parking lot subsystem and a vehicle cooperate with each other to jointly complete a valet parking task. Currently, when a user arrives at a fixed drop-off area, the parking lot subsystem needs to be authorized by the user, to transfer a driving authority from the user to the automated valet parking system, and mainly to the parking lot subsystem. When a vehicle arrives at a pickup area, the user needs to retrieve the driving authority, in other words, the driving authority needs to be transferred from the parking lot subsystem to the user. After the driving authority is transferred, a target to which the driving authority is transferred needs to be responsible for an accident that occurs after the driving authority is transferred.

A large quantity of traffic accidents are caused by an abnormal state of a system of a vehicle, especially by abnormity of a braking system and/or a steering system (functioning poorly or failing) of the vehicle that are or is closely related to vehicle operability/manipulability. Therefore, in a transfer process, it is quite necessary to check a status of the system of the vehicle, especially statuses or a status of the braking system and/or the steering system of the vehicle.

SUMMARY

This application provides a vehicle driving authority transfer method and apparatus, to check a status of a system of a vehicle before a driving authority of the vehicle is transferred.

According to a first aspect, this application provides a vehicle driving authority transfer method. The method includes: A communications device obtains first information. The first information is used to indicate a status of a system of a vehicle, and the system includes at least one of a braking system and a steering system. If the status of the system of the vehicle is normal, the communications device initiates transfer of a driving authority of the vehicle. Based on the foregoing solution, the status of the system of the vehicle is checked before the driving authority of the vehicle is transferred, and the driving authority of the vehicle is transferred only when it is determined that the status of the system of the vehicle is normal, to avoid a liability dispute resulting from a traffic accident caused by abnormality of a status of the vehicle, especially by abnormality of the braking system and/or the steering system closely related to vehicle operability/manipulability, after the driving authority of the vehicle is transferred.

In a possible implementation method, a status of the braking system includes one or more of the following: a normal state of the braking system, an abnormal state of the braking system, loss of longitudinal motion control, and heavy braking. A status of the steering system includes one or more of the following: a normal state of the steering system, an abnormal state of the steering system, loss of lateral motion control, and heavy steering.

In a possible implementation method, the communications device is a parking lot subsystem. The parking lot subsystem sends a first request message to the vehicle. The first request message is used to request to check the status of the system of the vehicle, and the first request message includes identification information of the vehicle. That a communications device obtains first information includes: The parking lot subsystem receives the first information from the vehicle. In this solution, the parking lot subsystem confirms the first information, and initiates transfer of the authority of the vehicle when determining that the status of the system of the vehicle is normal.

In a possible implementation method, that the parking lot subsystem sends a first request message to the vehicle includes: The parking lot subsystem sends the first request message to the vehicle by using a vehicle background and/or a parking lot subsystem background. The vehicle background is a background server corresponding to the vehicle, and the parking lot background is a background server corresponding to the parking lot subsystem.

In a possible implementation method, the communications device is a parking lot subsystem. The parking lot subsystem obtains a restricted driving authority of the vehicle. The restricted driving authority is a driving authority in specified duration and/or a delimited area. The parking lot subsystem sends a second request message to the vehicle. The second request message is used to request to perform a braking operation and/or a steering operation on the vehicle, and the second request message includes identification information of the vehicle. That a communications device obtains first information includes: The parking lot subsystem receives the first information from the vehicle, where the first information is generated based on results or a result of the braking operation and/or the steering operation of the vehicle; or the parking lot subsystem generates the first information based on detected results or a detected result of the braking operation and/or the steering operation of the vehicle. In this solution, the parking lot subsystem confirms the first information, and initiates transfer of the authority of the vehicle when determining that the status of the system of the vehicle is normal.

In a possible implementation method, the communications device is a parking lot subsystem background. The parking lot subsystem background sends the first request message to the vehicle by using a vehicle background. The vehicle background is a background server corresponding to the vehicle. That a communications device obtains first information includes: The parking lot subsystem background receives the first information from the vehicle by using the vehicle background. In this solution, the parking lot subsystem background confirms the first information, and initiates transfer of the authority of the vehicle when determining that the status of the system of the vehicle is normal.

In a possible implementation method, the parking lot subsystem obtains an operation key. The parking lot subsystem sends the operation key to the vehicle. The operation key is used to perform authentication on the driving authority of the parking lot subsystem on the vehicle.

In a possible implementation method, the communications device is the vehicle. That a communications device obtains first information includes: The vehicle checks the status of the system of the vehicle, and generates the first information. In this solution, the vehicle confirms the first information, and initiates transfer of the authority of the vehicle when determining that the status of the system of the vehicle is normal.

In a possible implementation method, the vehicle receives indication information from a vehicle background. The indication information is used to instruct to check the status of the system of the vehicle, and the vehicle background is a background server corresponding to the vehicle.

In a possible implementation method, the communications device is the vehicle. That a communications device obtains first information includes: The vehicle performs a braking operation and/or a steering operation, and generates the first information based on results or a result of the braking operation and/or the steering operation. In this solution, the vehicle confirms the first information, and initiates transfer of the authority of the vehicle when determining that the status of the system of the vehicle is normal.

In a possible implementation method, the vehicle receives a third request message from a parking lot subsystem. The third request message is used to request to perform a braking operation and/or a steering operation on the vehicle, and the third request message includes identification information of the vehicle.

In a possible implementation method, the communications device is a vehicle background, and the vehicle background is a background server corresponding to the vehicle. That a communications device obtains first information includes: The vehicle background receives the first information from the vehicle. In this solution, the vehicle background confirms the first information, and initiates transfer of the authority of the vehicle when determining that the status of the system of the vehicle is normal.

In a possible implementation method, that the communications device initiates transfer of a driving authority of the vehicle includes: The communications device sends a fourth request message to a terminal device, where the fourth request message is used to request to transfer the driving authority of the vehicle, and the fourth request message includes the identification information of the vehicle; and the communications device receives a response message from the terminal device, where the response message is used to acknowledge transfer of the driving authority of the vehicle.

According to a second aspect, this application provides a vehicle driving authority transfer apparatus. The apparatus may be a communications device, or may be a chip used for a communications device. The apparatus has a function of implementing the first aspect or each illustrative example of the first aspect. The function may be implemented by hardware, or may be implemented by hardware by executing corresponding software. The hardware or the software includes one or more modules corresponding to the function.

According to a third aspect, this application provides a vehicle driving authority transfer apparatus, including a processor and a memory. The memory is configured to store a computer executable instruction, and when the apparatus runs, the processor executes the computer executable instruction stored in the memory, so that the apparatus performs the method according to the first aspect or each illustrative example of the first aspect.

According to a fourth aspect, this application provides a vehicle driving authority transfer apparatus, including a unit or a means configured to perform steps in the first aspect or each illustrative example of the first aspect.

According to a fifth aspect, this application provides a vehicle driving authority transfer apparatus, including a processor and an interface circuit. The processor is configured to: communicate with another apparatus through the interface circuit, and perform the method in the first aspect or each illustrative example of the first aspect. There are one or more such processors.

According to a sixth aspect, this application provides a vehicle driving authority transfer apparatus, including a processor, configured to: connect to a memory, and invoke a program stored in the memory, to perform the method in the first aspect or each illustrative example of the first aspect. The memory may be located in the apparatus, or may be located outside the apparatus. In addition, there are one or more such processors.

According to a seventh aspect, this application further provides a computer-readable storage medium. The computer-readable storage medium stores an instruction, and when the instruction is run on a computer, a processor performs the method in the first aspect or each illustrative example of the first aspect.

According to an eighth aspect, this application further provides a computer program product including an instruction. When the instruction is run on a computer, the computer performs the method in the first aspect or each illustrative example of the first aspect.

According to a ninth aspect, this application further provides a chip system, including a processor, configured to perform the method in the first aspect or each illustrative example of the first aspect.

DESCRIPTION OF DRAWINGS

To make the objectives, technical solutions, and advantages of this application clearer, the following further describes this application in detail with reference to the accompanying drawings. A specific operation method in the method illustrative example may also be applied to the apparatus illustrative example or the system illustrative example. In the description of this application, unless otherwise stated, "a plurality of" means two or more than two.

Figure 1:
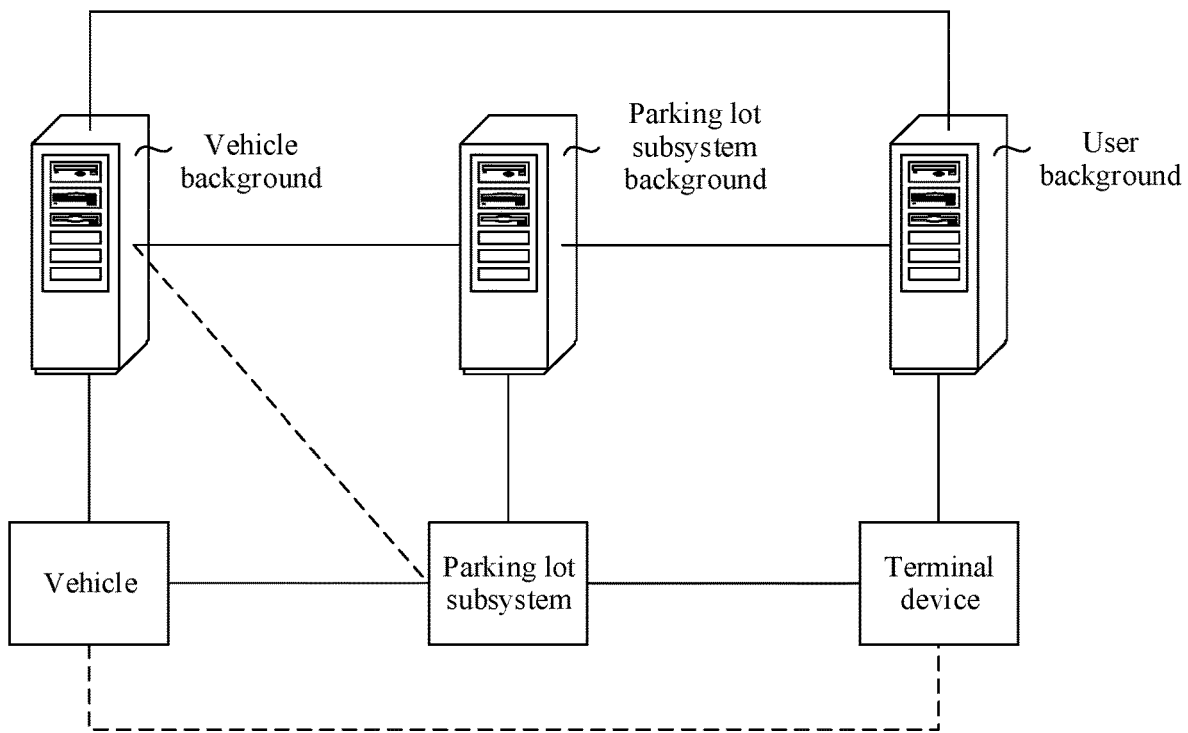
FIG. 1 is a possible schematic architectural diagram of a system according to this application.

FIG. 1 is a schematic architectural diagram of a system to which this application is applicable. The system may be any system related to driving authority transfer. For example, the system is the automated valet parking system described above. The system includes a parking lot subsystem, a parking lot subsystem background, a vehicle, and a vehicle background.

(1) Parking Lot Subsystem

The parking lot subsystem may also be referred to as a parking lot subsystem foreground or a parking lot foreground. The parking lot subsystem may directly interact with the vehicle to coordinate and direct an operation of the vehicle, or may interact with the vehicle by using the parking lot subsystem background.

The parking lot subsystem may further interact with the parking lot subsystem background to provide services such as a parking space reservation service.

Optionally, the parking lot subsystem may be equipped or associated with a large quantity of sensor devices (e.g., a camera, a radar, and a positioning sensor), a computing device, a device used for communication, and the like, to implement functions such as obstacle detection, vehicle positioning, path planning for the vehicle, and communication with the vehicle, thereby better coordinating and directing an operation of the vehicle.

(2) Parking Lot Subsystem Background

The parking lot subsystem background may also be referred to as a parking lot background, a parking lot server, a parking lot background server, a parking lot subsystem server, or the like, and is used to manage a parking facility (e.g., a parking lot). The parking lot subsystem background is a background server corresponding to the parking lot subsystem. The server may be a cloud server.

The parking lot subsystem and the parking lot subsystem background may also be collectively referred to as a parking lot system.

Optionally, the parking lot subsystem background may interact with the vehicle background to assist in completing communication between the parking lot subsystem and the vehicle.

In an implementation method, the parking lot subsystem and the parking lot subsystem background may be disposed on different physical devices. In another implementation method, alternatively, the parking lot subsystem and the parking lot subsystem background may be integrated into a same physical device.

(3) Vehicle

The vehicle may include at least one automated driving system.

In a narrow sense, the automated driving system is a system that includes hardware and software and that can perform an entire dynamic driving task on a sustained basis, regardless of whether an operational design domain is limited (The hardware and software that are collectively capable of performing the entire DDT on a sustained basis, regardless of whether it is limited to a specific operational design domain (ODD)).

In a broad sense, the automated driving system is a system that includes hardware and software and that can perform a part of a dynamic driving task or an entire dynamic driving task on a sustained basis.

The dynamic driving task is completing sensation, decision, and execution required for driving a vehicle. In other words, the dynamic driving task includes all real-time operational and tactical functions for driving a road vehicle, and excludes a strategic function such as trip planning and destination and path selection (All of the real-time operational and tactical functions required to operate a vehicle in on-road traffic, excluding the strategic functions such as trip scheduling and selection of destinations and waypoints). For example, the dynamic driving task includes but is not limited to the following subtasks: lateral vehicle motion control (Lateral vehicle motion control via steering (operational)), longitudinal vehicle motion control (Longitudinal vehicle motion control via acceleration and deceleration (operational)), monitoring a driving environment through object and event detection, recognition, and classification, preparing a response (Monitoring the driving environment via object and event detection, recognition, classification, and response preparation (operational and tactical)), executing the response (Object and event response execution (operational and tactical)), performing a driving decision (Maneuver planning (tactical)), and controlling a vehicle lighting and signal apparatus (Enhancing conspicuity via lighting, sounding the horn, signaling, gesturing, etc. (tactical)).

The vehicle and the parking lot subsystem may directly interact to jointly complete the dynamic driving task. For example, the parking lot subsystem delivers a parking lot map and location information of an idle parking space to the vehicle, and based on the map and the information about the idle parking space, the automated driving system of the vehicle may plan a corresponding path, monitor a surrounding environment, and operate the vehicle to arrive at a corresponding parking space. For another example, the parking lot subsystem may be equipped with a large quantity of sensor devices (e.g., a camera, a radar, and a positioning sensor), and in this case, the parking lot subsystem may perform functions such as path planning, obstacle detection, and vehicle positioning, and the parking lot subsystem may exchange real-time operation instruction information with the vehicle, to direct the vehicle to arrive at a parking space.

Optionally, the vehicle and the parking lot subsystem may interact by using the vehicle background, to jointly complete the dynamic driving task. Details are not described herein.

Optionally, the vehicle may further interact with the vehicle background, to implement activation, starting, authentication, and the like on the vehicle.

(4) Vehicle Background

The vehicle background may also be referred to as a vehicle server, a vehicle background server, or the like, and may be used to perform remote activation and starting on the vehicle and perform corresponding authentication. The server may be a cloud server.

Generally, the vehicle background belongs to an original equipment manufacturer (OEM), namely, a vehicle manufacturer, and the vehicle background is a background server corresponding to the vehicle.

Optionally, the vehicle background may interact with the parking lot subsystem background to assist in completing communication between the parking lot subsystem and the vehicle.

Optionally, the system shown in FIG. 1 may further include a user background and a terminal device.

(5) Terminal Device

The terminal device herein may be, for example, a mobile phone, a computer, a tablet computer, an in-vehicle display device, or an in-vehicle input device. Generally, a service that may be provided by an application (APP) of the terminal device for a user may include but is not limited to the following services: reserving a parking space, sending a vehicle retrieval request, receiving vehicle status information, and the like.

(6) User Background

The user background may also be referred to as a user server or a user background server, and is mainly used to maintain user information. The server may be a cloud server.

In an implementation method, the parking lot system (including the parking lot subsystem and the parking lot subsystem background), the vehicle, the vehicle background, and the user background may be all established and maintained by the vehicle manufacturer. In this case, the parking lot subsystem background, the user background, and the vehicle background may be disposed on different physical devices, or may be disposed on a same physical device.

It should be noted that in this application, that an external device or system (e.g., the parking lot subsystem, the vehicle background, the parking subsystem background, the user background, or the terminal device) interacts with the vehicle may be that the external device or system interacts with one or more automated driving systems of the vehicle, an automated driving subsystem in the automated driving system of the vehicle, or another device with a vehicle control function. The automated driving system, the automated driving subsystem, or the another device with a vehicle control function may be used as a part of the vehicle, namely, an in-vehicle device (which, for example, may be configured at delivery or subsequently installed), or may be a third-party standalone device that is connected to and communicates with the vehicle wirelessly or wiredly.

To resolve the problem mentioned in the background, this application provides a vehicle driving authority transfer method. In this method, a status of a system of a vehicle may be checked before a driving authority of the vehicle is transferred, to avoid a liability dispute resulting from a traffic accident caused by abnormality of a status of the system of the vehicle, especially by abnormality of a braking system and/or a steering system closely related to vehicle operability/manipulability, after the driving authority of the vehicle is transferred.

Figure 2:
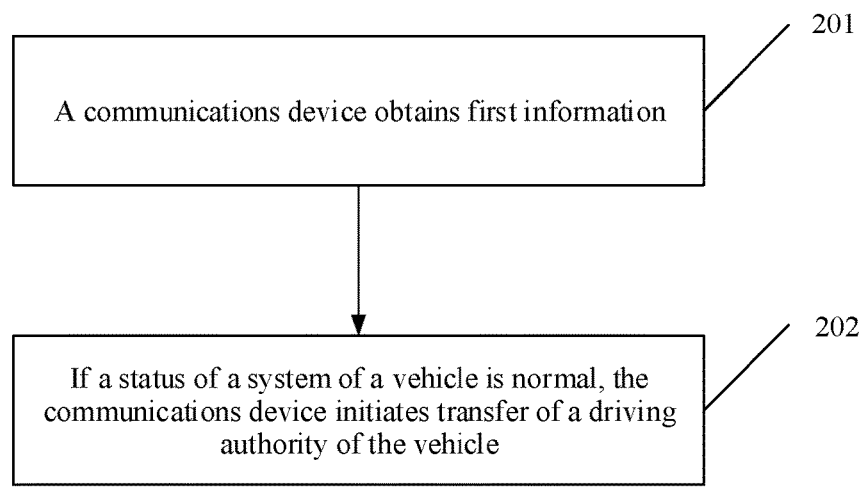
FIG. 2 is a schematic flowchart of a vehicle driving authority transfer method according to this application.

For the system architecture shown in FIG. 1, FIG. 2 is a schematic flowchart of a vehicle driving authority transfer method according to this application.

It should be noted that, this application uses the system architecture shown in FIG. 1 as an example to provide a method for transferring a driving authority from a user to a parking lot subsystem or from a parking lot subsystem to a user. However, this application is not limited to the foregoing scenario. In actual application, this application may be applied to any scenario in which a driving authority of a vehicle needs to be transferred. Correspondingly, the parking lot subsystem may also be replaced with another corresponding functional entity that can complete the technical solutions of the illustrative examples of this application. The method shown in FIG. 2 includes the following steps.

Step 201: A communications device obtains first information, where the first information is used to indicate a status of a system of a vehicle, and the system of the vehicle includes at least one of a braking system and a steering system.

The braking system may also be referred to as a deceleration system, and is used for longitudinal vehicle motion control. A status of the braking system may include one or more of the following: a normal state of the braking system, an abnormal state of the braking system, loss of longitudinal motion control, and heavy braking.

The steering system is used for lateral vehicle motion control, and a status of the steering system may include one or more of the following: a normal state of the steering system, an abnormal state of the steering system, loss of lateral motion control, and heavy steering.

It should be noted that the status of the system of the vehicle may also be described as operability of the system of the vehicle, manipulability of the system of the vehicle, an operability status of the system of the vehicle, an operation status of the system of the vehicle, or the like.

Optionally, the first information is a status check report or information used to indicate a status check report.

The first information may indicate the status of the braking system or the status of the steering system. Alternatively, the first information may indicate both the status of the braking system and the status of the steering system. For example, the first information indicates that the status of the braking system is normal and the status of the steering system is normal.

Generally, an automated driving system of the vehicle further includes a sensing system, a decision system, and an execution system. The sensing system is configured to sense environments inside and outside the vehicle, the decision system is configured to perform a decision such as path planning, and the execution system is configured to control movement of the vehicle. Therefore, the system of the vehicle in this application may further include at least one of the sensing system, the decision system, and the execution system in the automated driving system of the vehicle.

Optionally, the automated driving system of the vehicle may include a plurality of automated driving subsystems, and each subsystem performs a different automated driving function. For example, an automated valet parking system and a low-speed automated driving system perform different functions. Therefore, the system of the vehicle in this application may further include at least one automated driving subsystem in the automated driving system of the vehicle.

Step 202: If the status of the system of the vehicle is normal, the communications device initiates transfer of a driving authority of the vehicle.

The driving authority of the vehicle may also be referred to as a vehicle control authority or a vehicle operation authority.

That the status of the system of the vehicle is normal means that the braking system is normal and the steering system is normal. Correspondingly, that the status of the system of the vehicle is abnormal means that the braking system is abnormal and/or the steering system is abnormal. That the braking system is abnormal includes one or both of loss of longitudinal motion control and heavy braking, and that the steering system is abnormal includes one or both of loss of lateral motion control and heavy steering.

Based on the foregoing solution, the status of the system of the vehicle is checked before the driving authority of the vehicle is transferred, and the driving authority of the vehicle is transferred only when it is determined that the status of the system of the vehicle is normal, to avoid a liability dispute resulting from a traffic accident caused by abnormality of a status of the vehicle, especially by abnormality of the braking system and/or the steering system closely related to vehicle operability/manipulability, after the driving authority of the vehicle is transferred.

Optionally, the driving authority may be specific to an entire automated driving system, or may be specific to an automated driving subsystem, and the automated driving subsystem is configured to perform a specific automated driving function.

For the foregoing solution, the following provides several specific implementation methods for obtaining the first information by the communications device.

Case 1: In the illustrative example of FIG. 2, the communications device is a parking lot subsystem, or the communications device is a function module for implementing this illustrative example in a parking lot subsystem. The following provides descriptions by using an example in which the communications device is a parking lot subsystem, in other words, the parking lot subsystem initiates transfer of the driving authority of the vehicle.

In Case 1, a method for obtaining the first information by the parking lot subsystem may include the following implementation method 1 and implementation method 2.

Implementation method 1: The parking lot subsystem sends a first request message to the vehicle. The first request message is used to request to check the status of the system of the vehicle, and the first request message includes identification information of the vehicle. The parking lot subsystem receives the first information from the vehicle.

The check may also be referred to as detection. Optionally, the check includes diagnosis.

The identification information of the vehicle herein is used to uniquely identify the vehicle, or is used to uniquely identify a system (e.g., the automated driving system or an automated driving subsystem) of the vehicle. In an implementation, the identification information of the vehicle may be an identity (ID) of the vehicle. In an implementation, the identification information of the vehicle may be a vehicle license plate, a vehicle identification number, or an engine number of the vehicle.

For example, the parking lot subsystem may directly send the first request message to the vehicle, and then the vehicle checks the status of the system of the vehicle, generates the first information based on a check result, and sends the first information to the parking lot subsystem.

For another example, the parking lot subsystem may send the first request message to a vehicle background, then the vehicle background sends the first request message to the vehicle, or the vehicle background sends indication information to the vehicle, where the indication information is used to instruct the vehicle to check the status of the system of the vehicle, then the vehicle checks the status of the system of the vehicle, generates the first information based on a check result, and then sends the first information to the vehicle background, and then the vehicle background sends the first information to the parking lot subsystem.

For another example, the parking lot subsystem sends the first request message to a parking lot subsystem background, then the parking lot subsystem background sends the first request message to a vehicle background, then the vehicle background sends the first request message to the vehicle, or the vehicle background sends indication information to the vehicle, where the indication information is used to instruct the vehicle to check the status of the system of the vehicle, then the vehicle checks the status of the system of the vehicle, generates the first information based on a check result, and then sends the first information to the vehicle background, the vehicle sends the first information to the parking lot subsystem background, and then the parking lot subsystem background sends the first information to the parking lot subsystem.

It should be noted that the check in this implementation method is mainly that the vehicle performs self-check on the status of the system of the vehicle. Optionally, the vehicle may be in a still state during self-check. In this application, there may be many methods for checking the status of the system by the vehicle. A specific check method is not limited in the present application.

Implementation method 2: The parking lot subsystem obtains a restricted driving authority of the vehicle. The restricted driving authority is a driving authority in specified duration and/or a delimited area. The parking lot subsystem sends a second request message to the vehicle. The second request message is used to request to perform a braking operation and/or a steering operation on the vehicle, and the second request message includes identification information of the vehicle. The parking lot subsystem receives the first information from the vehicle, where the first information is generated based on results or a result of the braking operation and/or the steering operation of the vehicle, or the parking lot subsystem generates the first information based on detected results or a detected result of the braking operation and/or the steering operation of the vehicle.

The specified duration herein may be a fixed time period, in other words, a time start point and a time end point are specified, or the specified duration may be fixed duration, in other words, a time start point and a time end point are not specified, but duration is specified.

The restricted driving authority herein may also be understood as an advance authority, and is mainly used by the parking lot subsystem to check, by using the restricted driving authority, the status of the system of the vehicle, especially the statuses or the status of the braking system and/or the steering system closely related to vehicle operability/manipulability.

In an implementation, the parking lot subsystem may obtain the restricted driving authority by using the following method:

The parking lot subsystem applies to a user for the restricted driving authority. After the user agrees, the parking lot subsystem obtains the restricted driving authority of the vehicle.

Alternatively, in another implementation, the parking lot subsystem applies to a user for checking the status of the system of the vehicle, and the user agrees that the status of the system of the vehicle is to be checked, and provides the restricted driving authority for the parking lot subsystem for checking the system of the vehicle, especially the braking system and/or the steering system closely related to vehicle operability/manipulability.

Alternatively, in still another implementation, a parking lot subsystem background applies to a user for checking the status of the system of the vehicle, and the user agrees that the status of the system of the vehicle is to be checked, and provides the restricted driving authority for a parking lot system (including the parking lot subsystem and the parking lot subsystem background) for checking the system of the vehicle, especially the braking system and/or the steering system closely related to vehicle operability/manipulability. Optionally, the parking lot system grants the restricted driving authority to the parking lot subsystem for operating the vehicle.

The braking operation herein includes a deceleration operation, may be used for longitudinal vehicle motion control, and usually includes a brake pedal or the like. The steering operation is used for lateral vehicle motion control, and usually includes a rotating steering wheel or the like.

It should be noted that specific implementation forms or a specific implementation form of the braking system and/or the steering system are or is not limited in this illustrative example. The vehicle may alternatively have no conventional brake pedal and/or rotating steering wheel, provided that the vehicle includes an apparatus for controlling vehicle deceleration and/or steering.

Optionally, the braking operation and/or the steering operation herein may be operations or an operation performed when the vehicle is in a moving state.

In a possible implementation, that the parking lot subsystem requests the vehicle to perform a braking operation and/or a steering operation may also be that the parking lot subsystem sends a driving trajectory (trajectory) to the vehicle to require the vehicle to move along the trajectory, which may also mean that the parking lot subsystem requests the vehicle to perform a braking operation and/or a steering operation. For example, a predetermined trajectory includes a bend, and the vehicle drives based on the bend, in other words, performs a steering operation. For another example, the trajectory includes at least a start point or an end point, and the vehicle is required to stop at the end point position, in other words, perform a braking operation.

In this implementation method, the restricted driving authority of the vehicle may be transferred to the parking lot subsystem in advance, and then the parking lot subsystem requests the vehicle to perform a braking operation and/or a steering operation, so that the vehicle can generate the first information based on the results or the result of the braking operation and/or the steering operation, or the parking lot subsystem generates the first information based on the detected results or the detected result of the braking operation and/or the steering operation of the vehicle.

Case 2: In the illustrative example of FIG. 2, the communications device is the vehicle, in other words, the vehicle initiates transfer of the driving authority of the vehicle.

It may be understood that the vehicle may also be replaced with another function module completing this illustrative example. In Case 2, a method for obtaining the first information by the vehicle may include the following implementation method 1 and implementation method 2.

Implementation method 1: The vehicle checks the status of the system of the vehicle, and generates the first information.

The vehicle performs self-check on the status of the system of the vehicle. Optionally, the vehicle may be in a still state during self-check.

Optionally, the vehicle may receive indication information from a vehicle background. The indication information is used to instruct to check the status of the system of the vehicle.

Implementation method 2: The vehicle performs a braking operation and/or a steering operation on the vehicle, and generates the first information.

The vehicle performs a braking operation and/or a steering operation (refer to the foregoing description) on the vehicle, to generate the first information based on results or a result of the braking operation and/or the steering operation.

Optionally, before obtaining the entire driving authority of the vehicle, a parking lot subsystem may obtain a restricted driving authority (refer to the foregoing description) of the vehicle, and then the parking lot subsystem sends a request message (which may be referred to as a third request message in this application) to the vehicle. The request message is used to request to perform a braking operation and/or a steering operation on the vehicle, and the request message includes identification information of the vehicle. Then the vehicle performs a braking operation and/or a steering operation, and generates the first information based on results or a result of the braking operation and/or the steering operation.

Case 3: In the illustrative example of FIG. 2, the communications device is a vehicle background, in other words, the vehicle background initiates transfer of the driving authority of the vehicle.

In Case 3, the vehicle background obtains the first information by using the following method: The vehicle background receives the first information from the vehicle. For example, when the vehicle is in a moving state, the vehicle performs a braking operation and/or a steering operation on the vehicle, to generate the first information based on results or a result of the braking operation and/or the steering operation. Alternatively, when the vehicle is in a still state, the vehicle performs self-check on the status of the system of the vehicle, to generate the first information. Then the vehicle sends the first information to the vehicle background.

Based on the foregoing implementation methods, the communications device may obtain the first information, to determine whether the status of the system of the vehicle is normal or abnormal. Optionally, when the status of the system of the vehicle is abnormal, specific abnormality may be further learned.

In step 202, in an implementation method, that the communications device initiates transfer of the driving authority of the vehicle may be, for example, that the communications device sends a request message (which may be referred to as a fourth request message in this application) to a terminal device, where the request message is used to request to transfer the driving authority of the vehicle, and the request message includes the identification information of the vehicle; and then the communications device receives a response message from the terminal device, where the response message is used to acknowledge transfer of the driving authority of the vehicle.

Optionally, the driving authority may be specific to the entire automated driving system, or may be specific to an automated driving subsystem, and the automated driving subsystem is configured to perform a specific automated driving function.

That the communications device sends a request message to a terminal device may be that the request message is forwarded by using a user background, and that the communications device receives a response message from the terminal device may be that the response message is forwarded by using the user background.

In a possible implementation method, after the communications device sends the request message to the terminal device, the user background or the vehicle background may further allocate a same operation key to the vehicle and the parking lot subsystem. The operation key is used to perform authentication on the driving authority of the parking lot subsystem. In other words, after the user acknowledges that the driving authority can be transferred, the parking lot subsystem further needs to send an obtained operation key to the vehicle, and the vehicle compares the operation key received from the user background or the vehicle background with the operation key received from the parking lot subsystem. The driving authority of the vehicle is officially transferred from the user to the parking lot subsystem only after the comparison succeeds, so that the driving authority of the vehicle can be more securely transferred.

In another possible implementation method, after the communications device sends the request message to the terminal device, the user background or the vehicle background may further allocate an operation key to the parking lot subsystem. The operation key is used to perform authentication on the driving authority of the parking lot subsystem. In other words, after the user acknowledges that the driving authority can be transferred, the parking lot subsystem further needs to send the obtained operation key to the vehicle. One or more operation keys may be preconfigured on the vehicle (e.g., configured when the vehicle is delivered from a factory or configured when a software system of the vehicle is upgraded). The vehicle checks whether the operation key received from the parking lot subsystem is one of the preconfigured keys, and determines, based on a check result, whether to transfer the driving authority of the vehicle from the user to the parking lot subsystem, so that the driving authority of the vehicle can be more securely transferred.

In still another possible implementation method, after the communications device sends the request message to the terminal device, the user background or the vehicle background may further allocate an operation key to the parking lot subsystem. The operation key is used to perform authentication on the driving authority of the parking lot subsystem. In other words, after the user acknowledges that the driving authority can be transferred, the parking lot subsystem further needs to send the obtained key to the vehicle. A key operation rule or a key parsing rule may be preconfigured on the vehicle (e.g., configured when the vehicle is delivered from a factory or configured when a software system of the vehicle is upgraded). The vehicle performs an operation or parsing on the operation key received from the parking lot subsystem, and determines, based on an operation or parsing result, whether to transfer the driving authority of the vehicle from the user to the parking lot subsystem, so that the driving authority of the vehicle can be more securely transferred.

It should be noted that, it may be understood that the parking lot system includes both the parking lot subsystem and the parking lot subsystem background. The user background or the vehicle background may be concerned only with whether the driving authority is transferred to the parking lot system, instead of whether the driving authority is transferred to the parking lot subsystem or the parking lot subsystem background. Therefore, in the foregoing implementation methods, the user background or the vehicle background may allocate an operation key to the parking lot subsystem background, and then the parking lot subsystem background transfers the operation key to the parking lot subsystem for performing authentication on the driving authority of the vehicle.

With reference to FIG. 3 to FIG. 6, the following provides several specific implementation methods. In the following illustrative examples, an example in which the first information is a status check report is used for description. In addition, in the following illustrative examples, an example in which the driving authority of the vehicle is transferred from the user to the parking lot subsystem is used. In actual application, a process of transferring the driving authority of the vehicle from the parking lot subsystem to the user is similar to that in the following illustrative examples, and details are not described again.

Figure 3:
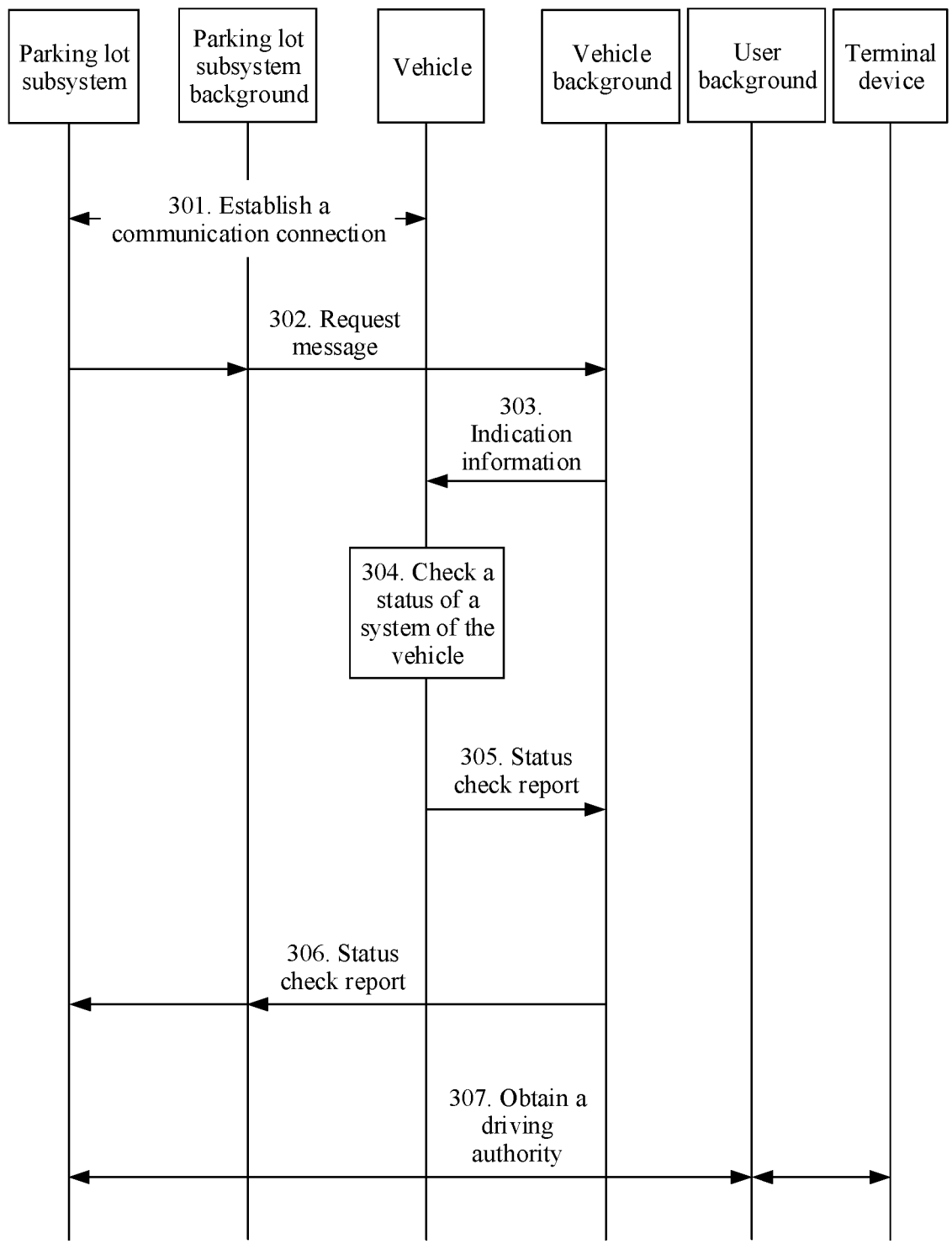
FIG. 3 is a schematic flowchart of another vehicle driving authority transfer method according to this application.

FIG. 3 is a schematic flowchart of another vehicle driving authority transfer method according to this application. The method includes the following steps.

Step 301: A parking lot subsystem establishes a communication connection to a vehicle.

After the vehicle moves to a specified drop-off area, identity sensation and identification may be performed between the vehicle and the parking lot subsystem. The vehicle obtains identification information of a parking lot, and the parking lot subsystem obtains identification information of the vehicle.

For an explanation of the identification information of the vehicle herein, refer to the foregoing description. Details are not described herein again. The identification information of the parking lot herein is used to uniquely identify the parking lot. In an implementation, the identification information of the parking lot may be an ID of the parking lot.

Then the vehicle sends information to a vehicle background. The information includes the identification information of the vehicle and the identification information of the parking lot, and the information is used to request to perform identity authentication.

Then the vehicle background determines an identity of the vehicle based on the identification information of the vehicle, and determines an identity of the parking lot based on the identification information of the parking lot. If both are valid, a communication connection between the parking lot subsystem and the vehicle is allowed, so that the parking lot subsystem establishes a communication connection to the vehicle.

Optionally, the vehicle background may further send a communication key (key) to the parking lot subsystem and the vehicle, to perform reliable communication between the parking lot subsystem and the vehicle. The communication key sent by the vehicle background to the parking lot subsystem may be sent by using a parking lot subsystem background.

This step is optional.

Step 302: The parking lot subsystem sends a request message to the vehicle background, where the request message includes the identification information of the vehicle, and the request message is used to request to check a status of a system of the vehicle. Correspondingly, the vehicle background receives the request message sent by the parking lot subsystem.

The parking lot subsystem may directly send the request message to the vehicle background, or the request message may be forwarded by using the parking lot background.

Step 303: The vehicle background sends indication information to the vehicle, where the indication information is used to instruct the vehicle to check the status of the system. Correspondingly, the vehicle receives the indication information sent by the vehicle background.

Alternatively, the vehicle background sends a request message to the vehicle, where the request message is used to request the vehicle to check the status of the system.

Step 304: The vehicle checks the status of the system.

Checking the status of the system herein includes, for example, checking a braking operation and/or a steering operation closely related to vehicle operability/manipulability.

It should be noted that the check herein is mainly that the vehicle performs self-check on the status of the system of the vehicle. Optionally, during self-check, the vehicle is in a still state instead of a driving state. In this application, there may be many methods for checking the status of the system by the vehicle. A specific check method is not limited in the present application.

Step 305: The vehicle sends a status check report to the vehicle background. Correspondingly, the vehicle background receives the status check report sent by the vehicle.

The status check report is used to indicate a checked status of a braking system and/or a checked status of a steering system of the vehicle.

Step 306: The vehicle background sends the status check report to the parking lot subsystem. Correspondingly, the parking lot subsystem receives the status check report sent by the vehicle background.

The vehicle background may directly send the status check report to the parking lot subsystem, or the status check report may be forwarded by using the parking lot subsystem background.

Step 307: A user transfers a driving authority to the parking lot subsystem. Correspondingly, the parking lot subsystem obtains the driving authority.

The parking lot subsystem determines, based on the status check report, that the vehicle is normal, especially the statuses or the status of the braking system and/or the steering system closely related to vehicle operability/manipulability are or is normal (e.g., the deceleration system and the steering system are normal), and requests to transfer the driving authority from the user to the parking lot subsystem.

For example, the parking lot subsystem may send a request message to a terminal device (the request message may be directly sent to the terminal device, or may be sent to the terminal device by using a user background, or may be sent to the terminal device by using the parking lot subsystem background). The request message is used to request to obtain the driving authority of the vehicle, and the request message includes the identification information of the vehicle. Then the user acknowledges, on an APP of the terminal device, that the authority is to be transferred, and triggers the APP of the terminal device to send a response message to the parking lot subsystem (the response message may be directly sent to the parking lot subsystem, or the response message may be sent to the parking lot subsystem by using the user background). The response message is used to acknowledge that the driving authority of the vehicle is to be transferred to the parking lot subsystem.

Optionally, the driving authority may be specific to an entire automated driving system, or may be specific to an automated driving subsystem, and the automated driving subsystem is configured to perform a specific automated driving function.

Optionally, after step 307, the user background, the parking lot subsystem, or the parking lot subsystem background may further report a transfer status of the driving authority of the vehicle to the vehicle background, in other words, notify the vehicle background that the driving authority of the vehicle has been transferred from the user to the parking lot subsystem.

Optionally, before step 307, the parking lot subsystem may further obtain an operation key. For example, the vehicle background separately allocates a same operation key to the vehicle and the parking lot subsystem, the parking lot subsystem sends the operation key to the vehicle, and the vehicle determines, by comparing the operation key sent by the parking lot subsystem with the operation key sent by the vehicle background, whether the parking lot subsystem has a driving authority on the vehicle. For another example, the user background or the vehicle background may further allocate an operation key to the parking lot subsystem, the parking lot subsystem sends the operation key to the vehicle, and the vehicle determines, by checking the operation key received from the parking lot subsystem and one or more keys preconfigured on the vehicle (e.g., configured when the vehicle is delivered from a factory or configured when a software system of the vehicle is upgraded), whether the parking lot subsystem has a driving authority on the vehicle.

For still another example, the user background or the vehicle background may further allocate an operation key to the parking lot subsystem, the parking lot subsystem sends the operation key to the vehicle, and the vehicle performs an operation/parsing on the received key based on a preconfigured key operation rule or key parsing rule (e.g., configured when the vehicle is delivered from a factory, or configured when a software system of the vehicle is upgraded), and determines, based on an operation or parsing result, whether the parking lot subsystem has a driving authority on the vehicle.

The operation key is used to perform authentication on the driving authority of the parking lot subsystem on the vehicle. In other words, when the parking lot subsystem makes a request for operating the vehicle to the vehicle, the vehicle performs authentication on the operation key of the parking lot subsystem, and only when the authentication succeeds, allows the vehicle operation requested by the parking lot subsystem. It should be noted that, alternatively, the operation key may be separately allocated by the user background to the vehicle (e.g., sent by using the vehicle background) and the parking lot subsystem (e.g., sent by using the parking lot subsystem background).

It should be noted that transfer of the driving authority may be triggered by the parking lot subsystem, or may be triggered by the user, the vehicle background, or the vehicle. This is not limited in this application.

Based on the foregoing implementation solution, before the driving authority of the vehicle is transferred from the user to the parking lot subsystem, the status of the system of the vehicle is effectively checked, especially the statuses or the status of the braking system and/or the steering system closely related to vehicle operability/manipulability are or is checked, to avoid a possible liability dispute.

Figure 4:
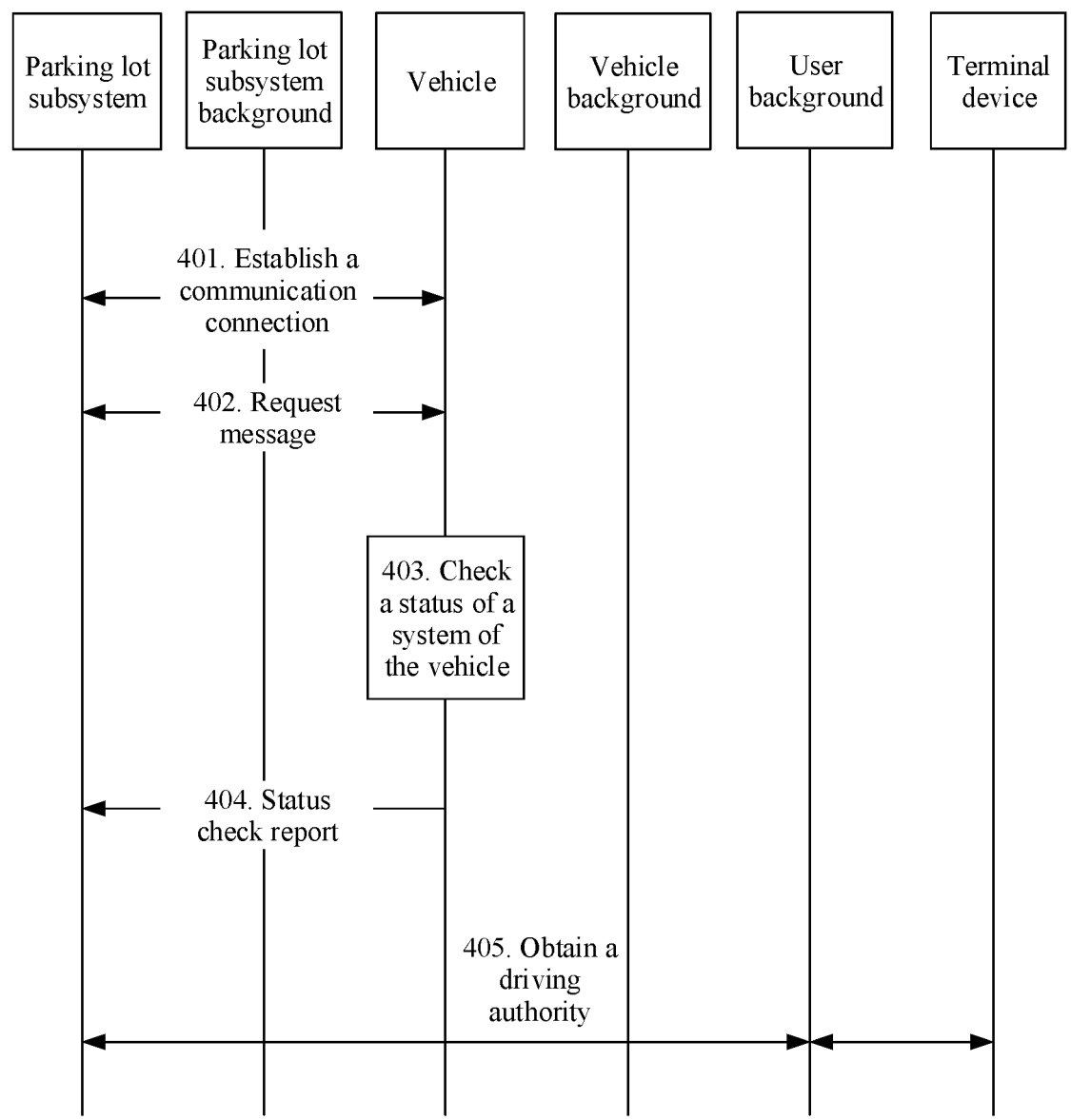
FIG. 4 is a schematic flowchart of another vehicle driving authority transfer method according to this application.

FIG. 4 is a schematic flowchart of another vehicle driving authority transfer method according to this application. The method includes the following steps.

Step 401: A parking lot subsystem establishes a communication connection to a vehicle.

This step is the same as step 301 in the illustrative example of FIG. 3. Refer to the foregoing description.

This step is optional.

Step 402: The parking lot subsystem sends a request message to the vehicle, where the request message is used to request to check a status of a system of the vehicle. Correspondingly, the vehicle receives the request message sent by the parking lot subsystem.

It should be noted that, before step 402, the parking lot subsystem needs to be authorized by a vehicle background. Optionally, after the authorization, the vehicle background may send an authorization key to the parking lot subsystem. The request message in step 402 may carry the authorization key, so that the vehicle can determine, based on the authorization key, that the parking lot subsystem is authorized (the vehicle may check that the parking lot subsystem is authorized, or the vehicle may send the authorization key to the vehicle background, and the vehicle background checks that the parking lot subsystem is authorized).

Step 403: The vehicle checks the status of the system of the vehicle.

This step is the same as step 304 in the illustrative example of FIG. 3. Refer to the foregoing description.

Step 404: The vehicle sends a status check report to the parking lot subsystem. Correspondingly, the parking lot subsystem receives the status check report sent by the vehicle.

The status check report is the same as the status check report in the illustrative example of FIG. 3. Refer to the foregoing description.

Step 405: A user transfers a driving authority to the parking lot subsystem.

Correspondingly, the parking lot subsystem obtains the driving authority.

This step is the same as step 307 in the illustrative example of FIG. 3. Refer to the foregoing description.

Based on the foregoing implementation solution, before the driving authority of the vehicle is transferred from the user to the parking lot subsystem, the status of the system of the vehicle is effectively checked, especially statuses or a status of a braking system and/or a steering system closely related to vehicle operability/manipulability are or is checked, to avoid a possible liability dispute. In comparison with the implementation solution shown in FIG. 3, in this implementation solution, the parking lot subsystem may be authorized by the vehicle background in advance, so that the parking lot subsystem can directly request the vehicle to check the status of the system of the vehicle, thereby simplifying a signaling process, reducing overheads, and increasing efficiency.

Figure 5:
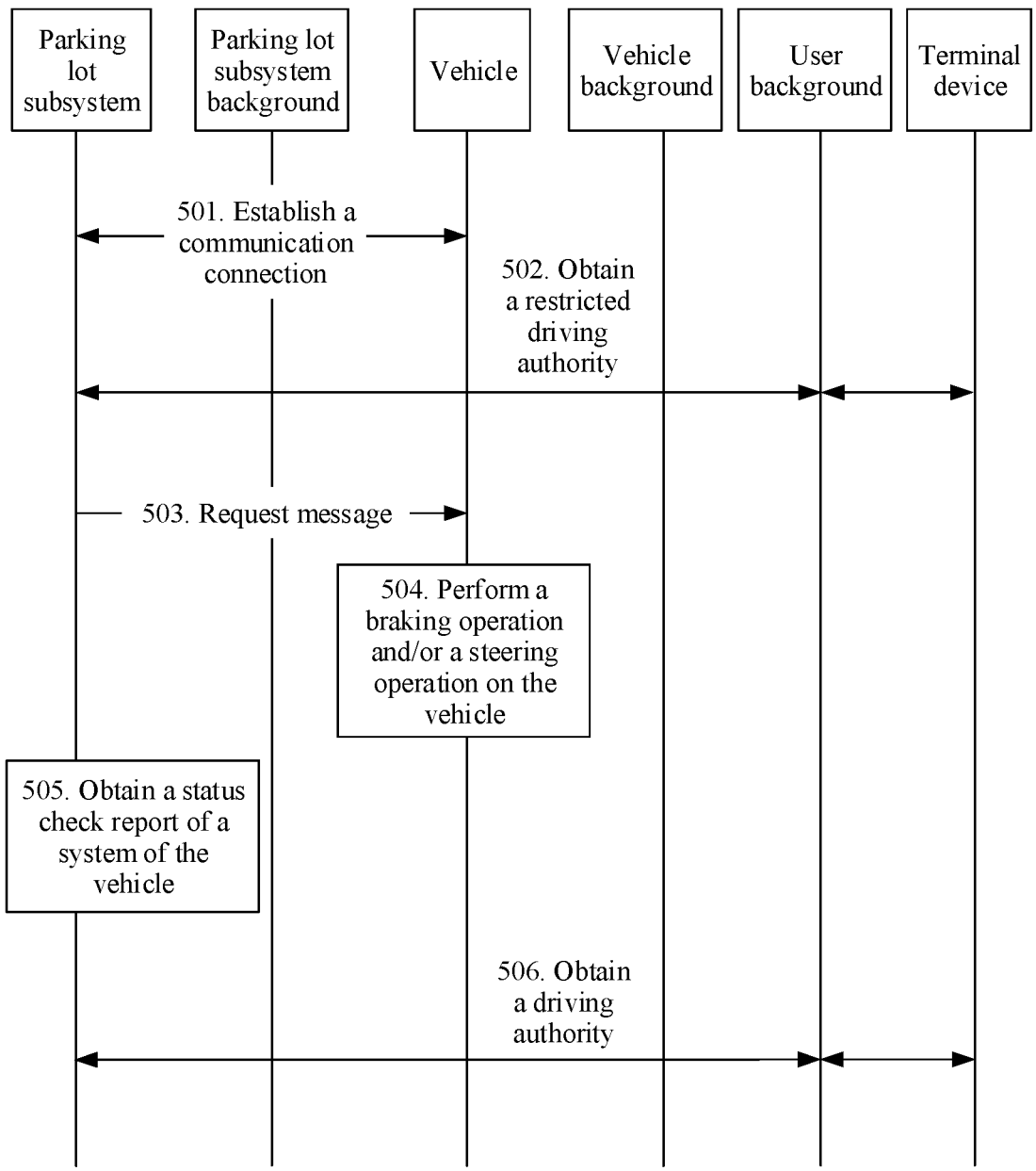
FIG. 5 is a schematic flowchart of another vehicle driving authority transfer method according to this application.

FIG. 5 is a schematic flowchart of another vehicle driving authority transfer method according to this application. The method includes the following steps.

Step 501: A parking lot subsystem establishes a communication connection to a vehicle.

This step is the same as step 301 in the illustrative example of FIG. 3. Refer to the foregoing description.

This step is optional.

Step 502: A user transfers a restricted driving authority to the parking lot subsystem. Correspondingly, the parking lot subsystem obtains the restricted driving authority.

The restricted driving authority herein may be, for example, a driving authority in specified duration, may be a driving authority in a delimited area, or may be a driving authority in specified duration and a delimited area.

For example, the parking lot subsystem may send a request message to a terminal device (the request message may be directly sent to the terminal device, or the request message may be sent to the terminal device by using a user background). The request message is used to request to transfer the restricted driving authority of the vehicle, and the request message includes identification information of the vehicle. Then the user acknowledges, on an APP of the terminal device, that the restricted authority is to be transferred, and triggers the APP of the terminal device to send a response message to the parking lot subsystem (the response message may be directly sent to the parking lot subsystem, or the response message may be sent to the parking lot subsystem by using the user background). The response message is used to acknowledge that the restricted driving authority of the vehicle is to be transferred to the parking lot subsystem.

For another example, the parking lot subsystem may send a request message to a terminal device (the request message may be directly sent to the terminal device, or the request message may be sent to the terminal device by using a user background). The request message is used to request to check a status of a system of the vehicle, and the request message includes identification information of the vehicle. Then the user acknowledges, on an APP of the terminal device, that check is to be performed, and triggers the APP of the terminal device to send a response message to the parking lot subsystem (the response message may be directly sent to the parking lot subsystem, or the response message may be sent to the parking lot subsystem by using the user background). The response message provides the restricted driving authority of the vehicle for the parking lot subsystem.

Optionally, after step 502, the user background or the parking lot subsystem may further report a transfer status of the restricted driving authority of the vehicle to a vehicle background, in other words, notify the vehicle background that the restricted driving authority of the vehicle has been transferred from the user to the parking lot subsystem.

Optionally, before step 502, the parking lot subsystem may further obtain a first operation key. For example, the vehicle background separately allocates a same first operation key to the vehicle and the parking lot subsystem, the parking lot subsystem sends the first operation key to the vehicle, and the vehicle determines, by comparing the operation key sent by the parking lot subsystem with the operation key sent by the vehicle background, whether the parking lot subsystem has a driving authority on the vehicle. For another example, the user background or the vehicle background may further allocate a first operation key to the parking lot subsystem, the parking lot subsystem sends the first operation key to the vehicle, and the vehicle determines, by checking the first operation key received from the parking lot subsystem and one or more keys preconfigured on the vehicle (e.g., configured when the vehicle is delivered from a factory or configured when a software system of the vehicle is upgraded), whether the parking lot subsystem has a driving authority on the vehicle. For still another example, the user background or the vehicle background may further allocate a first operation key to the parking lot subsystem, the parking lot subsystem sends the first operation key to the vehicle, and the vehicle performs an operation/parsing on the received first operation key based on a preconfigured key operation rule or key parsing rule (e.g., configured when the vehicle is delivered from a factory, or configured when a software system of the vehicle is upgraded), and determines, based on an operation or parsing result, whether the parking lot subsystem has a driving authority on the vehicle. The first operation key is used to perform authentication on the restricted driving authority of the parking lot subsystem on the vehicle. In other words, when the parking lot subsystem makes a request for operating the vehicle to the vehicle, the vehicle performs authentication on the first operation key of the parking lot subsystem, and only when the authentication succeeds, allows the restricted vehicle operation requested by the parking lot subsystem.

It should be noted that, alternatively, the first operation key may be separately allocated by the user background to the vehicle (e.g., sent by using the vehicle background) and the parking lot subsystem (e.g., sent by using a parking lot subsystem background).

It should be noted that transfer of the restricted driving authority may be triggered by the parking lot subsystem, or may be triggered by the user, the vehicle background, or the vehicle. This is not limited in this application.

Step 503: The parking lot subsystem sends a request message to the vehicle, where the request message is used to request the vehicle to perform a braking operation and/or a steering operation on the vehicle. Correspondingly, the vehicle receives the request message sent by the parking lot subsystem.

The braking operation herein is a deceleration operation, may be used for longitudinal vehicle motion control, and usually includes a brake pedal or the like. The steering operation is used for lateral vehicle motion control, and usually includes a rotating steering wheel or the like.

It should be noted that specific implementation forms or a specific implementation form of a braking system and/or a steering system are or is not limited in this illustrative example. The vehicle may alternatively have no conventional brake pedal and/or rotating steering wheel, provided that the vehicle includes an apparatus for controlling vehicle deceleration and/or steering.

Optionally, the braking operation and/or the steering operation herein are or is operations or an operation performed when the vehicle is in a moving state.

Step 504: The vehicle performs a braking operation and/or a steering operation on the vehicle.

Step 505: The parking lot subsystem obtains a status check report of the system of the vehicle.

The status check report is the same as the status check report in the illustrative example of FIG. 3. Refer to the foregoing description.

It should be noted that a specific implementation method for obtaining the status check report of the system of the vehicle by the parking lot subsystem is not limited in the present application. For example, the parking lot subsystem may detect a trajectory of the moving vehicle by using a sensor device disposed in a parking lot, or detect results or a result of the braking operation and/or the steering operation, to generate the status check report of the system of the vehicle. For another example, the vehicle may generate the status check report after the vehicle performs the braking operation and/or the steering operation, and send the status check report to the parking lot subsystem.

Step 506: The user transfers a driving authority to the parking lot subsystem. Correspondingly, the parking lot subsystem obtains the driving authority of the vehicle.

The driving authority herein may also mean obtaining an entire driving authority that is of the vehicle and that is not time-constraint and area-constraint. The parking lot subsystem determines, based on the status check report, that the status of the system of the vehicle is normal, and requests to transfer the driving authority from the user to the parking lot subsystem.

For example, the parking lot subsystem may send a request message to the terminal device (the request message may be directly sent to the terminal device, or the request message may be sent to the terminal device by using the user background). The request message is used to request to obtain the driving authority of the vehicle, and the request message includes the identification information of the vehicle. Then the user acknowledges, on the APP of the terminal device, that the authority is to be transferred, and triggers the APP of the terminal device to send a response message to the parking lot subsystem (the response message may be directly sent to the parking lot subsystem, or the response message may be sent to the parking lot subsystem by using the user background). The response message is used to acknowledge that the driving authority of the vehicle is to be transferred to the parking lot subsystem.

Optionally, after step 506, the user background, the parking lot subsystem, or the parking lot subsystem background may further report a transfer status of the driving authority of the vehicle to the vehicle background, in other words, notify the vehicle background that the driving authority of the vehicle has been transferred from the user to the parking lot subsystem.

Optionally, before step 506, the parking lot subsystem may further obtain a second operation key. For example, the vehicle background separately allocates a same second operation key to the vehicle and the parking lot subsystem, the parking lot subsystem sends the second operation key to the vehicle, and the vehicle determines, by comparing the operation key sent by the parking lot subsystem with the operation key sent by the vehicle background, whether the parking lot subsystem has a driving authority on the vehicle. For another example, the user background or the vehicle background may further allocate a second operation key to the parking lot subsystem, the parking lot subsystem sends the second operation key to the vehicle, and the vehicle determines, by checking the second operation key received from the parking lot subsystem and one or more keys preconfigured on the vehicle (e.g., configured when the vehicle is delivered from a factory or configured when a software system of the vehicle is upgraded), whether the parking lot subsystem has a driving authority on the vehicle. For still another example, the user background or the vehicle background may further allocate a second operation key to the parking lot subsystem, the parking lot subsystem sends the second operation key to the vehicle, and the vehicle performs an operation/parsing on the received second operation key based on a preconfigured key operation rule or key parsing rule (e.g., configured when the vehicle is delivered from a factory, or configured when a software system of the vehicle is upgraded), and determines, based on an operation or parsing result, whether the parking lot subsystem has a driving authority on the vehicle.

The second operation key is used to perform authentication on the driving authority of the parking lot subsystem on the vehicle. In other words, when the parking lot subsystem makes a request for operating the vehicle to the vehicle, the vehicle performs authentication on the second operation key of the parking lot subsystem, and only when the authentication succeeds, allows the vehicle operation requested by the parking lot subsystem. It should be noted that, alternatively, the second operation key may be separately allocated by the user background to the vehicle (e.g., sent by using the vehicle background) and the parking lot subsystem (e.g., sent by using the parking lot subsystem background). It should be noted that the second operation key herein may be the same as or different from the first operation key.

It should be noted that, it may be understood that a parking lot system includes both the parking lot subsystem and the parking lot subsystem background. The user background or the vehicle background may be concerned only with whether the driving authority is transferred to the parking lot system, instead of whether the driving authority is transferred to the parking lot subsystem or the parking lot subsystem background. Therefore, in the foregoing implementation methods, the user background or the vehicle background may allocate an operation key to the parking lot subsystem background, and then the parking lot subsystem background transfers the operation key to the parking lot subsystem for performing authentication on the driving authority of the vehicle.

It should be noted that transfer of the driving authority may be triggered by the parking lot subsystem, or may be triggered by the user, the vehicle background, or the vehicle. This is not limited in this application.

Based on the foregoing implementation solution, before the driving authority of the vehicle is transferred from the user to the parking lot subsystem, the status of the system of the vehicle is effectively checked, especially statuses or a status of the braking system and/or the steering system of the vehicle that are or is closely related to vehicle operability/manipulability are or is checked, to avoid a possible liability dispute caused by an abnormal state of the vehicle. In comparison with the implementation methods shown in FIG. 3 and FIG. 4, in this solution, the parking lot subsystem may first obtain the restricted driving authority, so that the parking lot subsystem can directly control the vehicle to perform a braking operation, and then obtain the status check report of the system of the vehicle. If it is determined that the status of the system of the vehicle is normal, the parking lot subsystem obtains the final driving authority.

Figure 6:
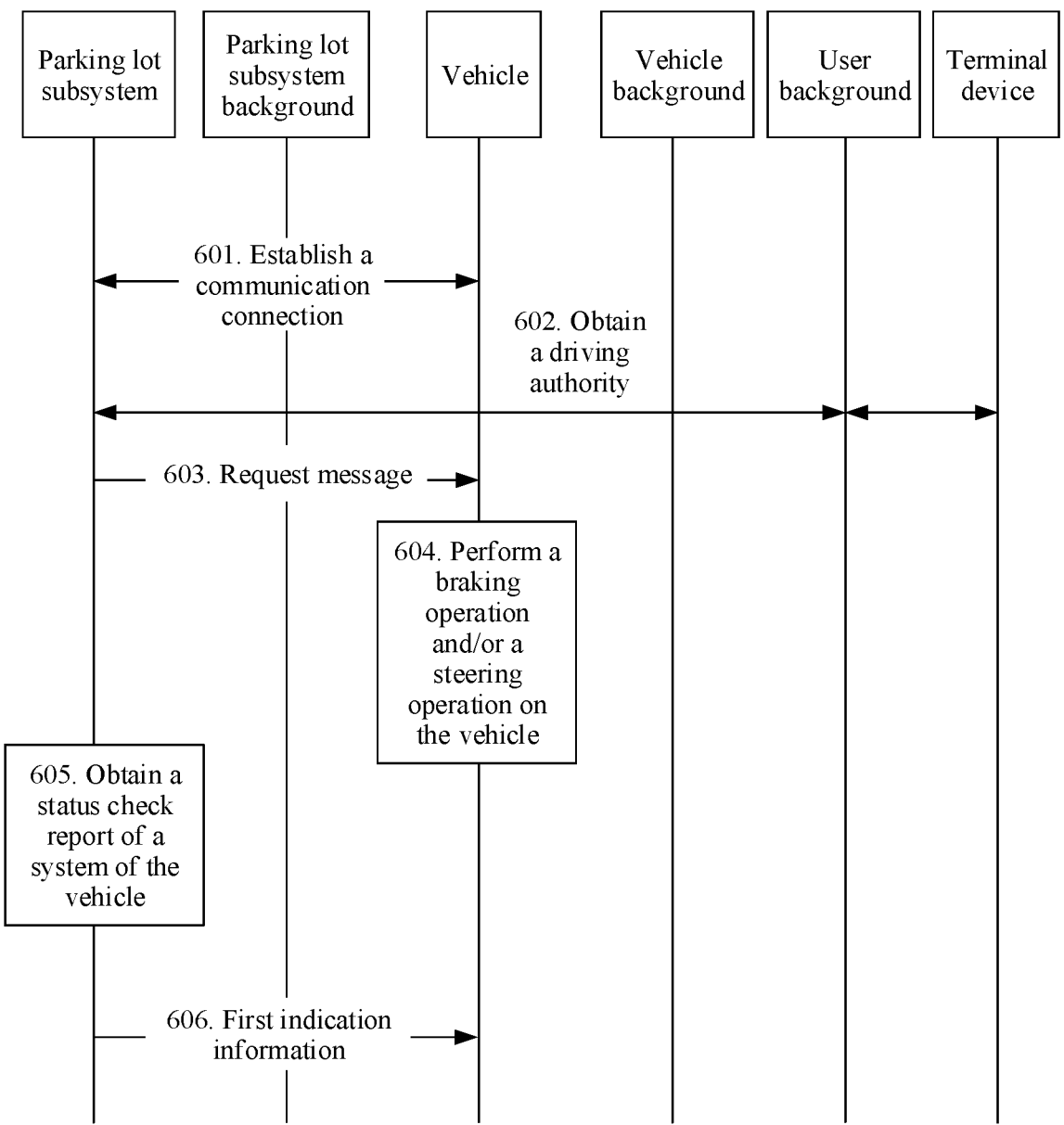
FIG. 6 is a schematic flowchart of another vehicle driving authority transfer method according to this application.

FIG. 6 is a schematic flowchart of another vehicle driving authority transfer method according to this application. The method includes the following steps.

Step 601: A parking lot subsystem establishes a communication connection to a vehicle.

This step is the same as step 301 in the illustrative example of FIG. 3. Refer to the foregoing description.

This step is optional.

Step 2: A user transfers a restricted driving authority to the parking lot subsystem. Correspondingly, the parking lot subsystem obtains the driving authority of the vehicle.

This step is the same as step 307 in the illustrative example of FIG. 3. Refer to the foregoing description.

Step 603 to step 605 are the same as step 503 to step 505 in the illustrative example of FIG. 5. Refer to the foregoing description.

Step 606: The parking lot subsystem sends first indication information to the vehicle. Correspondingly, the vehicle receives the first indication information sent by the parking lot subsystem.

When determining, based on the status check report, that the vehicle is normal, the parking lot subsystem sends the first indication information to the vehicle, to indicate that the vehicle is normal.

When determining, based on the status check report, that the status of the system of the vehicle is abnormal, the parking lot subsystem may send second indication information to the vehicle, to indicate that the status of the system of the vehicle is abnormal or indicate that the driving authority of the vehicle is to be returned, or when determining, based on the status check report, that the status of the system of the vehicle is abnormal, the parking lot subsystem does not send any information to the vehicle. When the vehicle receives the second indication information or does not receive information, the vehicle or the parking lot subsystem is triggered to request a terminal device to reclaim the driving authority of the vehicle, in other words, request the user to reclaim the driving authority of the vehicle.

Based on the foregoing implementation solution, before the driving authority of the vehicle is transferred from the user to the parking lot subsystem, the status of the system of the vehicle is effectively checked, especially statuses or a status of a braking system and/or a steering system closely related to vehicle operability/manipulability are or is effectively checked, to avoid a possible liability dispute caused by an abnormal state of the vehicle. In comparison with the implementation methods shown in FIG. 3 and FIG. 4, in this solution, the parking lot subsystem may first obtain the driving authority, so that the parking lot subsystem can directly control the vehicle to perform a braking operation, and then obtain the status check report of the system of the vehicle. If it is determined that the status of the system of the vehicle is abnormal, the parking lot subsystem sends the second indication information or does not send any information to the vehicle, so that the user is triggered to reclaim the driving authority.

Figure 7:
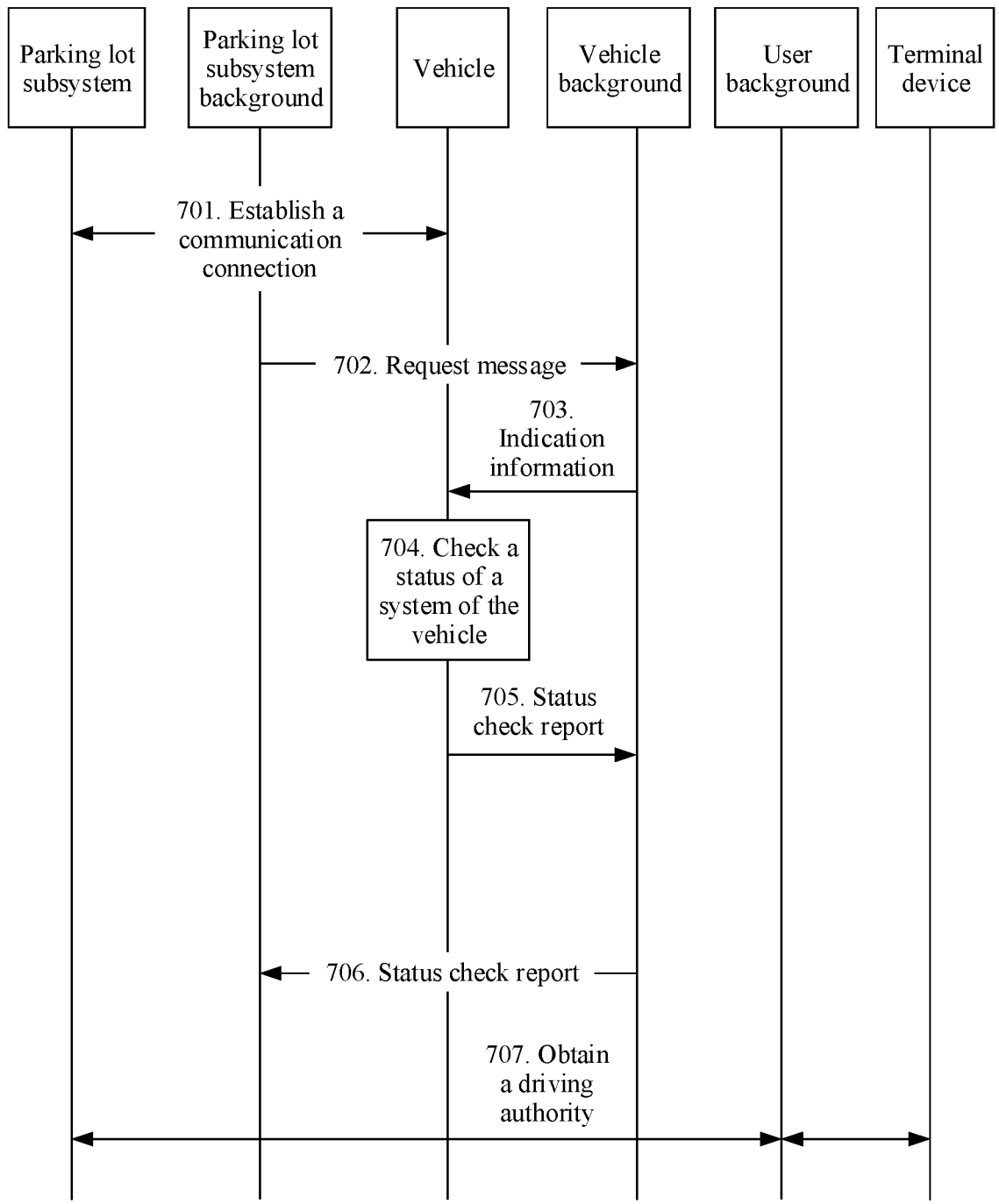
FIG. 7 is a schematic flowchart of another vehicle driving authority transfer method according to this application.

FIG. 7 is a schematic flowchart of another vehicle driving authority transfer method according to this application. The method includes the following steps.

Step 701: A parking lot subsystem establishes a communication connection to a vehicle.

This step is optional.

This step is the same as step 301 in the illustrative example of FIG. 3. Refer to the foregoing description.

Optionally, the parking lot subsystem may also send identification information of the vehicle to a parking lot subsystem background.

Step 702: The parking lot subsystem background sends a request message to a vehicle background, where the request message includes the identification information of the vehicle, and the request message is used to request to check a status of a system of the vehicle. Correspondingly, the vehicle background receives the request message sent by the parking lot subsystem background.

Step 703: The vehicle background sends indication information to the vehicle, where the indication information is used to instruct the vehicle to check the status of the system. Correspondingly, the vehicle receives the indication information sent by the vehicle background.

Alternatively, the vehicle background sends a request message to the vehicle, where the request message is used to request the vehicle to check the status of the system.

Step 704: The vehicle checks the status of the system.

Checking the status of the system herein includes, for example, checking a braking operation and/or a steering operation closely related to vehicle operability/manipulability.

It should be noted that the check herein is mainly that the vehicle performs self-check on the status of the system of the vehicle. Optionally, during self-check, the vehicle is in a still state instead of a driving state. In this application, there may be many methods for checking the status of the system by the vehicle. A specific check method is not limited in the present application.

Step 705: The vehicle sends a status check report to the vehicle background.

Correspondingly, the vehicle background receives the status check report sent by the vehicle.

The status check report is used to indicate a checked status of a braking system and/or a checked status of a steering system of the vehicle.

Step 706: The vehicle background sends the status check report to the parking lot subsystem background. Correspondingly, the parking lot subsystem receives the status check report sent by the vehicle background. Correspondingly, the parking lot subsystem background receives the status check report sent by the vehicle background.

Step 707: A user transfers a driving authority to a parking lot system. Correspondingly, the parking lot system obtains the driving authority.

The parking lot subsystem background determines, based on the check report, that the vehicle is normal, especially the statuses or the status of the braking system and/or the steering system closely related to vehicle operability/manipulability are or is normal (e.g., the deceleration system and the steering system are normal), and requests to transfer the driving authority from the user to the parking lot system.

For example, the parking lot subsystem background may send a request message to a terminal device (the request message may be directly sent to the terminal device, or the request message may be sent to the terminal device by using a user background). The request message is used to request the parking lot system to obtain the driving authority of the vehicle, and the request message includes the identification information of the vehicle. Then the user acknowledges, on an APP of the terminal device, that the authority is to be transferred, and triggers the APP of the terminal device to send a response message to the parking lot subsystem background (the response message may be directly sent to the parking lot subsystem background, or the response message may be sent to the parking lot subsystem background by using the user background). The response message is used to acknowledge that the driving authority of the vehicle is to be transferred to the parking lot system.

Optionally, the parking lot system grants the driving authority to the parking lot subsystem, so that the parking lot subsystem operates the vehicle.

Optionally, the driving authority may be specific to an entire automated driving system, or may be specific to an automated driving subsystem, and the automated driving subsystem is configured to perform a specific automated driving function.

It may be understood that the parking lot system includes both the parking lot subsystem and the parking lot subsystem background. The user may be concerned only with whether the driving authority is transferred to the parking lot system, instead of whether the driving authority is transferred to the parking lot subsystem or the parking lot subsystem background. It is also proper for the user to transfer the driving authority to the parking lot system.

Based on the foregoing implementation solution, before the driving authority of the vehicle is transferred from the user to the parking lot system, the status of the system of the vehicle is effectively checked, especially the statuses or the status of the braking system and/or the steering system closely related to vehicle operability/manipulability are or is checked, to avoid a possible liability dispute.

The solutions provided in this application are mainly described above from a perspective of interaction between network elements. It may be understood that, to implement the foregoing functions, each network element includes a corresponding hardware structure and/or software module for implementing each function. A person skilled in the art should easily be aware that, in combination with the examples described in the illustrative examples disclosed in this specification, units and algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present application.

Figure 8:
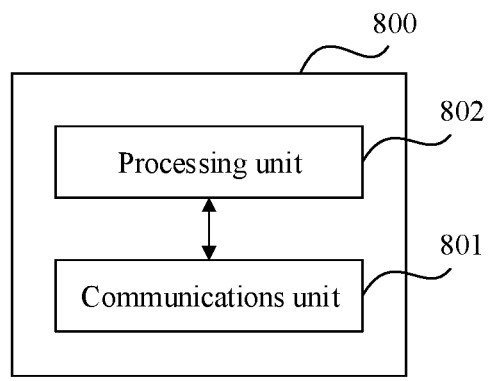
FIG. 8 is a schematic diagram of a vehicle driving authority transfer apparatus according to this application.

FIG. 8 is a possible example block diagram of a vehicle driving authority transfer apparatus according to this application. The apparatus 800 may exist in a form of software or hardware. The apparatus 800 may include a processing unit 802 and a communications unit 801. In an implementation, the communications unit 801 may include a receiving unit and a sending unit. The processing unit 802 is configured to control and manage an action of the apparatus 800. The communications unit 801 is configured to support the apparatus 800 in communicating with another network entity.

The processing unit 802 may be a processor or a controller, such as a general-purpose central processing unit (CPU), a general-purpose processor, digital signal processing (DSP), an application-specific integrated circuit (ASIC), a field programmable gate array (FPGA), or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of a DSP and a microprocessor. The communications unit 801 is an interface circuit of the apparatus, and is configured to receive a signal from another apparatus. For example, when the apparatus is implemented in a form of a chip, the communications unit 801 is an interface circuit of the chip for receiving a signal from another chip or apparatus, or an interface circuit of the chip for sending a signal to another chip or apparatus.

The apparatus 800 may be the communications device in any one of the foregoing illustrative examples, or may be a chip used for the communications device. For example, when the apparatus 800 is the communications device, the processing unit 802 may be a processor, and the communications unit 801 may be a transceiver. Optionally, the transceiver may include a radio frequency circuit. For example, when the apparatus 800 is a chip used for the communications device, the processing unit 802 may be a processor, and the communications unit 801 may be an input/output interface, a pin, a circuit, or the like. The processing unit 802 may execute a computer executable instruction stored in a storage unit. Optionally, the storage unit is a storage unit, for example, a register or a cache, in the chip. Alternatively, the storage unit may be a storage unit, for example, a read-only memory (ROM), another type of static storage device that can store static information and an instruction, or a random access memory (RAM), that is in the communications device and that is located outside the chip.

In an illustrative example, the communications unit 801 is configured to obtain first information, where the first information is used to indicate a status of a system of a vehicle, and the system includes at least one of a braking system and a steering system; and the processing unit 802 is configured to: if the status of the system of the vehicle is normal, initiate transfer of a driving authority of the vehicle.

In a possible implementation method, a status of the braking system includes one or more of the following: a normal state of the braking system, an abnormal state of the braking system, loss of longitudinal motion control, and heavy braking, and a status of the steering system includes one or more of the following: a normal state of the steering system, an abnormal state of the steering system, loss of lateral motion control, and heavy steering.

In a possible implementation method, the apparatus 800 is a parking lot subsystem; and the communications unit 801 is configured to: send a first request message to the vehicle, where the first request message is used to request to check the status of the system of the vehicle, and the first request message includes identification information of the vehicle; and receive the first information from the vehicle.

In a possible implementation method, the communications unit 801 is specifically configured to send the first request message to the vehicle by using a vehicle background and/or a parking lot subsystem background, where the vehicle background is a background server corresponding to the vehicle, and the parking lot background is a background server corresponding to the parking lot subsystem.

In a possible implementation method, the apparatus 800 is a parking lot subsystem; and the communications unit 801 is configured to: obtain a restricted driving authority of the vehicle, where the restricted driving authority is a driving authority in specified duration and/or a delimited area; send a second request message to the vehicle, where the second request message is used to request to perform a braking operation and/or a steering operation on the vehicle, and the second request message includes identification information of the vehicle; and receive the first information from the vehicle, where the first information is generated based on results or a result of the braking operation and/or the steering operation of the vehicle; or generate the first information based on detected results or a detected result of the braking operation and/or the steering operation of the vehicle.

In a possible implementation method, the apparatus 800 is a parking lot subsystem background; and the communications unit 801 is configured to: send the first request message to the vehicle by using a vehicle background, where the vehicle background is a background server corresponding to the vehicle; and receive the first information from the vehicle by using the vehicle background.

In a possible implementation method, the communications unit 801 is further configured to: obtain an operation key, and send the operation key to the vehicle, where the operation key is used to perform authentication on the driving authority of the parking lot subsystem on the vehicle.

In a possible implementation method, the apparatus 800 is the vehicle; and the communications unit 801 is specifically configured to: check the status of the system of the vehicle, and generate the first information.

In a possible implementation method, the communications unit 801 is further configured to receive indication information from a vehicle background, where the indication information is used to instruct to check the status of the system of the vehicle, and the vehicle background is a background server corresponding to the vehicle.

In a possible implementation method, the apparatus 800 is the vehicle; and the processing unit 802 is further configured to: perform a braking operation and/or a steering operation, and generate the first information based on results or a result of the braking operation and/or the steering operation.

In a possible implementation method, the communications unit 801 is further configured to receive a third request message from a parking lot subsystem, where the third request message is used to request to perform a braking operation and/or a steering operation on the vehicle, and the third request message includes identification information of the vehicle.

In a possible implementation method, the apparatus 800 is a vehicle background, and the vehicle background is a background server corresponding to the vehicle; and the communications unit 801 is specifically configured to receive the first information from the vehicle.

In a possible implementation method, the processing unit 802 is specifically configured to: instruct the communications unit 801 to send a fourth request message to a terminal device, where the fourth request message is used to request to transfer the driving authority of the vehicle, and the fourth request message includes the identification information of the vehicle; and instruct the communications unit 801 to receive a response message from the terminal device, where the response message is used to acknowledge transfer of the driving authority of the vehicle.

It may be understood that, for a specific implementation process and a corresponding beneficial effect of the apparatus 800 when the apparatus 800 is used for the foregoing vehicle driving authority transfer method, reference may be made to related descriptions in the foregoing method illustrative examples, and details are not described herein again.

Figure 9:
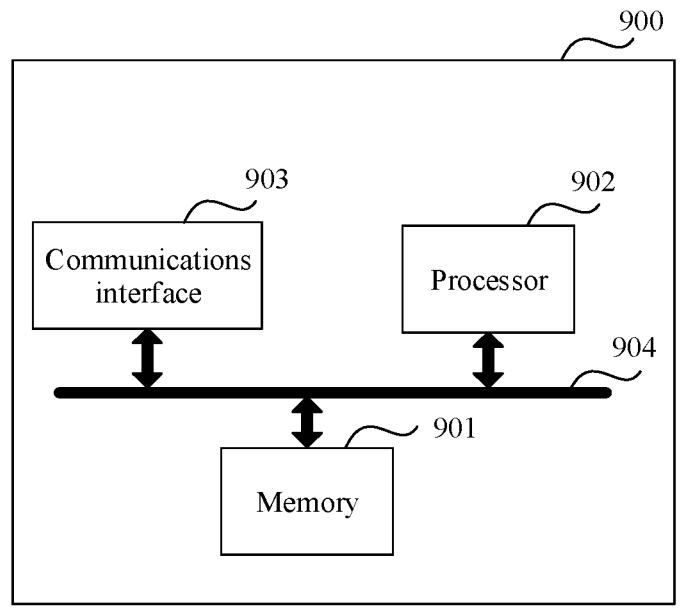
FIG. 9 is a schematic diagram of another vehicle driving authority transfer apparatus according to this application.

FIG. 9 is a schematic diagram of a vehicle driving authority transfer apparatus according to this application. The apparatus may be the communications device in the foregoing illustrative examples. The apparatus 900 includes a processor 902, a communications interface 903, and a memory 901. Optionally, the apparatus 900 may further include a communications line 904. The communications interface 903, the processor 902, and the memory 901 may be connected to each other by using the communications line 904. The communications line 904 may be a peripheral component interconnect (PCI) bus, an extended industry standard architecture (EISA) bus, or the like. The communications line 904 may be classified into an address bus, a data bus, a control bus, and the like. For ease of representation, only one thick line is used to represent the communications line in FIG. 9, but this does not mean that there is only one bus or only one type of bus.

The processor 902 may be a CPU, a microprocessor, an ASIC, or one or more integrated circuits configured to control program execution in the solutions of this application.

The communications interface 903 is any apparatus like a transceiver, and is configured to communicate with another device or a communications network such as the Ethernet, a radio access network (RAN), a wireless local area network (WLAN), or a wired access network.

The memory 901 may be a ROM or another type of static storage device capable of storing static information and an instruction, or a RAM or another type of dynamic storage device capable of storing information and an instruction, or may be an electrically erasable programmable read-only memory (EEPROM), a compact disc read-only memory (CD-ROM), or another compact disc storage or optical disc storage (including a compressed optical disc, a laser disc, an optical disc, a digital versatile disc, a Blu-ray optical disc, and the like), a magnetic disk storage medium or another magnetic storage device, or any other medium capable of carrying or storing expected program code in a form of an instruction or a data structure and capable of being accessed by a computer, but is not limited thereto. The memory may exist independently and is connected to the processor by using the communications line 904. The memory may be alternatively integrated with the processor.

The memory 901 is configured to store a computer executable instruction for executing the solutions of this application, and execution of the computer executable instruction is controlled by the processor 902. The processor 902 is configured to execute the computer executable instruction stored in the memory 901, to implement the vehicle driving authority transfer method provided in the foregoing illustrative examples of this application.

Optionally, the computer executable instruction in this illustrative example of this application may also be referred to as application program code. This is not specifically limited in this illustrative example of this application.

A person of ordinary skill in the art may understand that various numbers such as first and second in this application are for distinguishing only for ease of description, and are not intended to limit the scope of the illustrative examples of this application or indicate a sequence. The term "and/or" describes an association relationship between associated objects and represents that three relationships may exist. For example, A and/or B may represent the following three cases: Only A exists, both A and B exist, and only B exists. The character "/" generally indicates an "or" relationship between the associated objects. "at least one" means one or more. At least two means two or more. "at least one", "any one", or a similar expression means any combination of these items, including any combination of one or more of the items. For example, at least one of a, b, and c may indicate a, b, c, a and b, a and c, b and c, or a, b, and c, where a, b, and c may be singular or plural. "a plurality of" means two or more, and another quantifier is similar to this. In addition, elements (element) of singular forms "a", "an" and "the" do not mean there is "one or only one" such elements but "one or more" such elements unless specified in the context. For example, "a device" means one or more such devices.

All or some of the foregoing illustrative examples may be implemented by using software, hardware, firmware, or any combination thereof. When software is used to implement the illustrative examples, all or some of the illustrative examples may be implemented in a form of a computer program product. The computer program product includes one or more computer instructions. When the computer program instructions are loaded and executed on a computer, all or some of the procedures or functions according to the illustrative examples of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (e.g., a coaxial cable, an optical fiber, or a digital subscriber line (DSL)) or wireless (e.g., infrared, radio, or microwave) manner. The computer-readable storage medium may be any usable medium accessible by a computer, or a data storage device, such as a server or a data center, integrating one or more usable media. The usable medium may be a magnetic medium (e.g., a floppy disk, a hard disk, or a magnetic tape), an optical medium (e.g., a DVD), a semiconductor medium (e.g., a solid state disk (SSD)), or the like.

The various illustrative logical units and circuits described in the illustrative examples of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may be any conventional processor, controller, microcontroller, or state machine. Alternatively, the processor may be implemented by a combination of computing apparatuses, for example, a digital signal processor and a microprocessor, a plurality of microprocessors, one or more microprocessors in combination with a digital signal processor core, or any other similar configuration.

Steps of the methods or algorithms described in the illustrative examples of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor, so that the processor can read information from the storage medium and write information into the storage medium. Optionally, the storage medium may be integrated into a processor. The processor and the storage medium may be disposed in an ASIC.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this application is described with reference to specific features and the illustrative examples thereof, clearly, various modifications and combinations may be made to them without departing from the spirit and scope of this application. Correspondingly, this specification and the accompanying drawings are merely example description of this application defined by the accompanying claims, and are considered as any of or all modifications, variations, combinations or equivalents that cover the scope of this application. Clearly, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A vehicle driving authority transfer method, for a vehicle, carried out by a communication device physically detached with respect to the vehicle, the method comprising:
obtaining first information indicating a physical status of the vehicle based on a current status of at least one system of the vehicle taken from the group consisting of:
a braking system status, and
a steering system status; and
initiating, in accordance with the first information indicating the current status of the at least one system of the vehicle being normal, transfer of a driving authority of the vehicle,
wherein the initiating transfer of a driving authority of the vehicle comprises:
sending, to a terminal device, a fourth request message requesting transfer of the driving authority of the vehicle; and
receiving, from the terminal device in response to the fourth request message, a response message acknowledging the transfer of the driving authority of the vehicle.

2. The method according to claim 1, wherein the communications device is a parking lot subsystem, and the method further comprises:
sending a first request message to the vehicle requesting the vehicle to check status of the vehicle system, and the first request message comprises identification information of the vehicle; and
the obtaining first information comprises:
receiving the first information from the vehicle.

3. The method according to claim 2, wherein the sending a first request message to a vehicle comprises:
sending the first request message to the vehicle by using a vehicle background and/or a parking lot subsystem background,
wherein the vehicle background is a background server corresponding to the vehicle, and the parking lot background is a background server corresponding to the parking lot subsystem.

4. The method according to claim 1, wherein the communications device is a parking lot subsystem, and the method further comprises:
obtaining a restricted driving authority of the vehicle referring to a driving authority in a specified duration and/or a specified area;
sending a second request message to the vehicle requesting to perform a braking operation and/or a steering operation on the vehicle, and the second request message comprises identification information of the vehicle; and
the obtaining first information comprises:
receiving the first information from the vehicle that is generated based on results or a result of the braking operation and/or the steering operation of the vehicle; or generating the first information based on detected results or a detected result of the braking operation and/or the steering operation of the vehicle.

5. The method according to claim 1, wherein the communications device is a parking lot subsystem background, and the method further comprises:
sending a first request message to the vehicle by using a vehicle background, wherein the vehicle background is a background server corresponding to the vehicle; and
the obtaining first information comprises:
receiving the first information from the vehicle by using the vehicle background.

6. The method according to claim 2, wherein the method further comprises:
obtaining an operation key; and
sending the operation key to the vehicle, wherein the operation key is used to perform authentication on the driving authority of the parking lot subsystem on the vehicle.

7. The method according to claim 1, wherein the communications device is the vehicle, and wherein the obtaining first information comprises:
checking the status of the system of the vehicle, and
generating the first information.

8. The method according to claim 7, wherein the method further comprises:
receiving indication information from a vehicle background instructing to check the status of the system of the vehicle, and the vehicle background is a background server corresponding to the vehicle.

9. The method according to claim 1, wherein the communications device is the vehicle; and
the obtaining first information comprises:
performing a braking operation and/or a steering operation, and generating the first information based on results or a result of the braking operation and/or the steering operation.

10. The method according to claim 9, wherein the method further comprises:
receiving a third request message from a parking lot subsystem requesting to perform the braking operation and/or a steering operation on the vehicle, and the third request message comprises identification information of the vehicle.

11. The method according to claim 1, wherein the communications device is a vehicle background, and the vehicle background is a background server corresponding to the vehicle; and
the obtaining first information comprises:
receiving the first information from the vehicle.

12. The method according to claim 1, wherein
the fourth request message comprises an identification information of the vehicle.

13. A vehicle driving authority transfer apparatus comprising a communication device physically detached with respect to a vehicle, comprising:
a processor; and
a computer-readable medium including computer-executable instructions that, when executed by the processor, cause the vehicle driving authority transfer apparatus to carry out a method comprising:
obtaining first information indicating a physical status of the vehicle based on a current status of at least one system of the vehicle taken from the group consisting of:
a braking system status, and
a steering system status; and
initiating, in accordance with the first information indicating the current status of the at least one system of the vehicle being normal, transfer of a driving authority of the vehicle,
wherein the initiating transfer of a driving authority of the vehicle comprises:

sending, to a terminal device, a fourth request message requesting transfer of the driving authority of the vehicle; and
receiving, from the terminal device in response to the fourth request message, a response message acknowledging the transfer of the driving authority of the vehicle.

14. The apparatus according to claim 13, wherein the apparatus is a parking lot subsystem; and the method further comprises:
sending a first request message to the vehicle requesting the vehicle to check status of the vehicle system, and the first request message comprises identification information of the vehicle; and
the obtaining first information comprises:
receiving the first information from the vehicle.

15. The apparatus according to claim 14, wherein the sending a first request message to a vehicle comprises:
sending the first request message to the vehicle by using a vehicle background and/or a parking lot subsystem background,
wherein the vehicle background is a background server corresponding to the vehicle, and the parking lot background is a background server corresponding to the parking lot subsystem.

16. The apparatus according to claim 13, wherein the apparatus is a parking lot subsystem, and the method further comprises:
obtaining a restricted driving authority of the vehicle referring to a driving authority in a specified duration and/or a specified area;
sending a second request message to the vehicle requesting to perform a braking operation and/or a steering operation on the vehicle, and the second request message comprises identification information of the vehicle; and
the obtaining first information comprises:
receiving the first information from the vehicle that is generated based on results or a result of the braking operation and/or the steering operation of the vehicle; or generating the first information based on detected results or a detected result of the braking operation and/or the steering operation of the vehicle.

17. The apparatus according to claim 13, wherein the apparatus is a parking lot subsystem background, and the method further comprises:
sending a first request message to the vehicle by using a vehicle background, wherein the vehicle background is a background server corresponding to the vehicle; and
the obtaining first information comprises:
receiving the first information from the vehicle by using the vehicle background.

18. The apparatus according to claim 14, wherein the method further comprises:
obtaining an operation key; and
sending the operation key to the vehicle, wherein the operation key is used to perform authentication on the driving authority of the parking lot subsystem on the vehicle.

19. The apparatus according to claim 13, wherein the apparatus is the vehicle; and wherein the obtaining first information comprises:
checking the status of the system of the vehicle, and generating the first information.

20. The apparatus according to claim 19, wherein the receiving indication information from a vehicle background instructing to check the status of the system of the vehicle, and the vehicle background is a background server corresponding to the vehicle.

21. The apparatus according to claim 13, wherein the apparatus is the vehicle; and wherein the obtaining first information comprises:
performing a braking operation and/or a steering operation, and generating the first information based on results or a result of the braking operation and/or the steering operation.

22. The apparatus according to claim 21, wherein the method further comprises:
receiving a third request message from a parking lot subsystem requesting to perform the braking operation and/or a steering operation on the vehicle, and the third request message comprises identification information of the vehicle.

23. The apparatus according to claim 13, wherein the apparatus is a vehicle background, and the vehicle background is a background server corresponding to the vehicle; and the obtaining first information comprises:
receiving the first information from the vehicle.

24. The apparatus according to claim 13, wherein the fourth request message comprises the identification information of the vehicle.

25. A non-transitory computer-readable storage medium, comprising computer-executable instructions that, when executed on a processor of a communication device physically detached with respect to a vehicle, facilitate carrying out a vehicle driving authority transfer method including:
obtaining first information indicating a physical status of the vehicle based on a current status of at least one system of the vehicle taken from the group consisting of:
a braking system status, and
a steering system status; and
initiating, in accordance with the first information indicating the current status of the at least one system of the vehicle being normal, transfer of a driving authority of the vehicle,
wherein the initiating transfer of a driving authority of the vehicle comprises:
sending, to a terminal device, a fourth request message requesting transfer of the driving authority of the vehicle; and
receiving, from the terminal device in response to the fourth request message, a response message acknowledging the transfer of the driving authority of the vehicle.

26. The non-transitory computer-readable medium of claim 25, wherein the first information indicating a physical status of the vehicle is taken from the group consisting of:
the braking system status, wherein the first information comprises a braking system physical status indication including at least one of:
a normal state of the braking system,
an abnormal state of the braking system,
loss of longitudinal motion control, and
heavy braking; and
the steering system status, wherein the first information comprises a steering system physical status indication including at least one of:
a normal state of the steering system,
an abnormal state of the steering system,
loss of lateral movement control, and
heavy steering.

27. The vehicle driving authority transfer method of claim 1, wherein the first information indicating a physical status of the vehicle is taken from the group consisting of:
 the braking system status, wherein the first information comprises a braking system physical status indication including at least one of:
  a normal state of the braking system,
  an abnormal state of the braking system,
  loss of longitudinal motion control, and
  heavy braking; and
 the steering system status, wherein the first information comprises a steering system physical status indication including at least one of:
  a normal state of the steering system,
  an abnormal state of the steering system,
  loss of lateral movement control, and
  heavy steering.

28. The apparatus of claim 13, wherein the first information indicating a physical status of the vehicle is taken from the group consisting of:
 the braking system status, wherein the first information comprises a braking system physical status indication including at least one of:
  a normal state of the braking system,
  an abnormal state of the braking system,
  loss of longitudinal motion control, and
  heavy braking; and
 the steering system status, wherein the first information comprises a steering system physical status indication including at least one of:
  a normal state of the steering system,
  an abnormal state of the steering system,
  loss of lateral movement control, and
  heavy steering.

* * * * *